US011182104B2

(12) United States Patent
Kim et al.

(10) Patent No.: US 11,182,104 B2
(45) Date of Patent: Nov. 23, 2021

(54) METHOD OF OPERATING STORAGE DEVICE WITH A PLURALITY OF STREAMS USING A DATA CLASSIFIER, STORAGE DEVICE PERFORMING THE SAME AND STORAGE SYSTEM INCLUDING THE SAME

(71) Applicant: Samsung Electronics Co., Ltd., Suwon-si (KR)

(72) Inventors: Byeong-Hui Kim, Hwaseong-si (KR); Jung-Min Seo, Seongnam-si (KR); Hyeon-gyu Min, Seoul (KR); Seung-Jun Yang, Hwaseong-si (KR); Joo-Young Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 20 days.

(21) Appl. No.: 16/416,805

(22) Filed: May 20, 2019

(65) Prior Publication Data

US 2020/0150892 A1 May 14, 2020

(30) Foreign Application Priority Data

Nov. 12, 2018 (KR) ......................... 10-2018-0138077

(51) Int. Cl.
*G06F 3/06* (2006.01)
*G06N 3/08* (2006.01)

(52) U.S. Cl.
CPC .......... *G06F 3/0655* (2013.01); *G06F 3/0604* (2013.01); *G06F 3/0679* (2013.01); *G06N 3/08* (2013.01)

(58) Field of Classification Search
None
See application file for complete search history.

(56) References Cited

U.S. PATENT DOCUMENTS 7,679,133 B2 3/2010 Son et al.
8,553,466 B2 10/2013 Han et al.
(Continued)

FOREIGN PATENT DOCUMENTS

CN 106250064 A 12/2016

OTHER PUBLICATIONS

Jeong-Uk Kang, Jeeseok Hyun, Hyunjoo Maeng, and Sangyeun Cho. 2014. The multi-streamed solid-state drive. In Proceedings of the 6th USENIX conference on Hot Topics in Storage and File Systems (HotStorage'14). USENIX Association, USA, 13. (Year: 2014).*

(Continued)

*Primary Examiner* — Charles Rones
*Assistant Examiner* — Ralph A Verderamo, III
(74) *Attorney, Agent, or Firm* — Harness, Dickey & Pierce, P.L.C.

(57) ABSTRACT

In a method of operating a storage device, the storage device includes a plurality of memory blocks. A data write request and target data to be written are received. Using a data classifier, such as a neural network model, the target data is assigned to a stream selected from a plurality of streams based on a data property of the target data. The target data is written into a memory block assigned to a stream selected for assignment of the target data, such that target data that has been assigned to a stream are written into the one or more memory blocks assigned to the stream.

20 Claims, 22 Drawing Sheets

(56) References Cited

U.S. PATENT DOCUMENTS

| | | |
|---|---|---|
| 8,559,235 B2 | 10/2013 | Yoon et al. |
| 8,654,587 B2 | 2/2014 | Yoon et al. |
| 9,069,915 B2 | 6/2015 | Branson et al. |
| 9,251,284 B2 | 2/2016 | Van Velzen et al. |
| 10,019,172 B2 | 7/2018 | Mitkar et al. |
| 2011/0233648 A1 | 9/2011 | Seol et al. |
| 2014/0056068 A1 | 2/2014 | Strasser et al. |
| 2016/0247080 A1 | 8/2016 | Trantham et al. |
| 2017/0090759 A1 | 3/2017 | Ioannou et al. |
| 2017/0116520 A1* | 4/2017 | Min ................ G06N 3/08 |
| 2017/0164011 A1 | 6/2017 | Rimon et al. |
| 2017/0371585 A1 | 12/2017 | Lazo et al. |
| 2018/0039448 A1* | 2/2018 | Harasawa ............ G06F 3/0619 |
| 2018/0074700 A1* | 3/2018 | Tsalmon ............... G06F 3/0679 |
| 2018/0157968 A1 | 6/2018 | Henry et al. |
| 2018/0203998 A1 | 7/2018 | Maisel et al. |
| 2018/0225553 A1 | 8/2018 | Ha et al. |
| 2019/0065058 A1* | 2/2019 | Camp ..................... G06F 3/064 |

OTHER PUBLICATIONS

Hwanjin Yong, Kisik Jeong, Joonwon Lee, and Jin-Soo Kim. 2018. VStream: virtual stream management for multi-streamed SSDs. In Proceedings of the 10th USENIX Conference on Hot Topics in Storage and File Systems (HotStorage'18). USENIX Association, USA, 18. (Year: 2018).*

Extended European Search Report dated Mar. 10, 2020 for EP Application No. 19193490.0.

* cited by examiner

METHOD OF OPERATING STORAGE DEVICE WITH A PLURALITY OF STREAMS USING A DATA CLASSIFIER, STORAGE DEVICE PERFORMING THE SAME AND STORAGE SYSTEM INCLUDING THE SAME

CROSS-REFERENCE TO RELATED APPLICATION

This application claims priority under 35 USC § 119 to Korean Patent Application No. 10-2018-0138077, filed on Nov. 12, 2018 in the Korean Intellectual Property Office (KIPO), the contents of which are herein incorporated by reference in their entirety.

BACKGROUND

1. Technical Field

The present disclosure relates generally to semiconductor integrated circuits, including methods of operating storage devices, storage devices performing the methods, and/or storage systems including the storage devices.

2. Description of the Related Art

Certain types of data storage devices include one or more semiconductor memory devices. Examples of such data storage devices include solid state drives (SSDs). These types of data storage devices may enjoy various design and/or performance advantages over hard disk drives (HDDs). Examples of potential advantages include the absence of moving mechanical parts, higher data access speeds, stability, durability, and/or low power consumption. These types of data storage device may include nonvolatile memory devices, for example, flash memories. In a flash memory of an SSD, an erase operation may be performed before a write operation. As data are continuously written to a flash memory, the data may become scattered over the entire flash memory. Recently, researchers are conducting various research projects on techniques of obtaining a free memory block or a storage space to which data may be written and/or increasing life expectancy of the storage device.

SUMMARY

Some example embodiments may include a method of operating a storage device including a plurality of memory blocks of a memory device, wherein the method includes receiving a data write request and target data to be written, assigning the target data to a stream selected from a plurality of streams using a data classifier that is configured to select the stream from the plurality of streams based on a data property of the target data, writing the target data into a memory block selected from the plurality of memory blocks, wherein the memory block has been assigned to the stream to which the target data has been assigned.

Some example embodiments may include a storage device including a plurality of memory blocks a storage controller configured to receive a data write request and target data to be written, assign the target data to a stream selected from a plurality of streams using a data classifier that is configured to select the stream from the plurality of streams based on a data property of the target data, and write the target data into a memory block selected from the plurality of memory blocks, wherein the memory block has been assigned to the stream to which the target data has been assigned.

Some example embodiments may include a storage system including a host configured to provide a data write request and target data and a storage device including a plurality of memory blocks and a storage controller configured to write the target data into the plurality of memory blocks based on the data write request, wherein the storage controller includes a data classifier that is configured to select a stream from a plurality of streams based on a data property of the target data, and wherein the storage controller is configured to receive the data write request and the target data, assign the target data to the stream selected from the plurality of streams using the data classifier, and write the target data into a memory block that is assigned to the stream.

In some example embodiments, a storage device may control the multi-stream scheme even if a host does not support the multi-stream scheme. Overhead for garbage collection may be reduced, write latency and write amplification factor (WAF) may be reduced, write throughput may be increased, and/or the storage device may have higher performance and/or life expectancy.

BRIEF DESCRIPTION OF THE DRAWINGS

Some illustrative, non-limiting example embodiments may be understood from the following detailed description taken in conjunction with the accompanying drawings.

DETAILED DESCRIPTION

Figure 1:
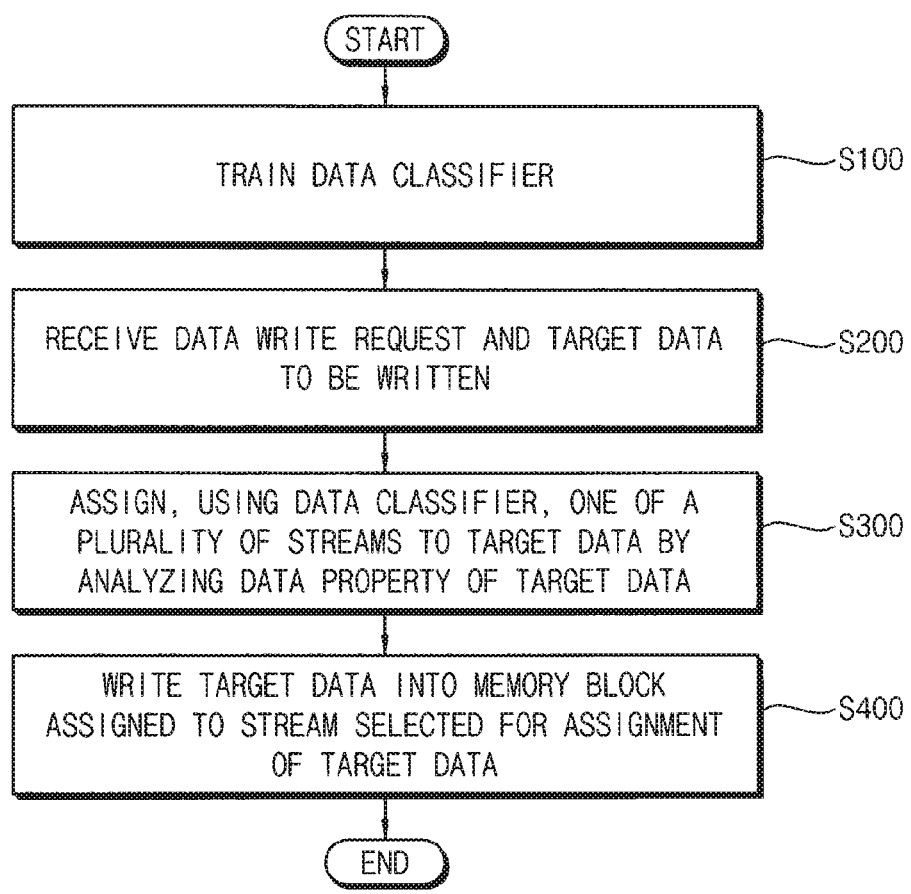
FIG. 1 is a flowchart illustrating a method of operating a storage device according to some example embodiments.

Various example embodiments may be described more fully with reference to the accompanying drawings, in which some example embodiments are shown. The present disclosure may, however, be embodied in many different forms and is not limited to the example embodiments set forth herein. Like reference numerals refer to like elements throughout this application.

FIG. 1 is a flowchart illustrating a method of operating a storage device according to some example embodiments.

In some example embodiments, such storage devices may include a plurality of memory blocks and operates in a multi-stream scheme independently of a control of a host. Configurations of the storage device and a storage system including the storage device are described with reference to FIG. 2 and the like.

In a method of operating the storage device according to some example embodiments, a data classifier, for example, a neural network model (NNM), may be trained and/or learned (operation S100). The data classifier may be pre-trained and/or pre-learned such that a plurality of data are written into the plurality of memory blocks based on which of a plurality of streams are associated with the plurality of data. For example, the data classifier may be pre-trained and/or pre-learned outside the storage device, and then may be embedded in the storage device.

A data write request and target data to be written are received (e.g., from an external device) (operation S200). For example, the data write request and the target data may be provided from an external host and/or received by a storage controller.

Using the data classifier, one of a plurality of streams is selected for assignment of the target data by analyzing a data property of the target data (operation S300).

In some example embodiments, as described with reference to FIGS. 6 and 7, a data property for assigning the stream, for example, a data property for classifying the target data, may be associated with a lifetime which represents a change period of data, respective streams may represent a lifetime or change period of the target data. In other example embodiments, as described with reference to FIGS. 8 through 13, a data property for assigning the stream; respective streams may represent a regularity of the target data; and/or a data property for classifying the target data may be associated with a regularity of data. In still other example embodiments, a data property for assigning the stream, for example, a data property for classifying the target data, may be associated with at least one of various attributes of the target data, including metadata, such as may be stored by a file system and/or a memory system, and/or usage information, such as may be determined by an operating system.

Based on a stream selected for assignment of the target data, the target data is written into a memory block corresponding to the stream selected for assignment of the target data such that data with a single stream are written into a single memory block (operation S400). In some example embodiments, target data having a similar lifetime or change period may be assigned to a stream and/or may be stored in memory blocks that are assigned to the stream. In other example embodiments, target data having similar regularity may be assigned to a stream and/or may be stored in memory blocks that are assigned to the stream. In still other example embodiments, target data having similar attributes may be assigned to a stream and/or may be stored in memory blocks that are assigned to the stream.

The storage device according to some example embodiments may be configured to operate based on a multi-stream scheme in which the plurality of data written into the plurality of memory blocks are classified into and/or managed by the plurality of streams such that the storage device writes data associated with the same stream into the same single memory block. In some example embodiments, one memory block included in the storage device may only store target data assigned to the same stream. In other example embodiments, target data assigned to the same stream may be stored in different memory blocks of the plurality of memory blocks, where the different memory blocks are assigned to the same stream.

Unlike a multi-stream scheme that is controlled and/or driven by the host and/or depends on the host, the storage device according to some example embodiments may assign a stream to data to be written using the data classifier, and/or may operate in a multi-stream scheme using the self-assigned stream, based on the method of operating the storage device according to some example embodiments. In other words, operations S300 and/or S400 in FIG. 1 may be performed independently of the control of the host (e.g., regardless of the host), the storage device may control the multi-stream scheme even if the host does not support the multi-stream scheme. Accordingly, overhead for garbage collection may be reduced, write latency and/or write amplification factor (WAF) (e.g., an amount of data written by a solid-state storage controller as compared with an amount of data written by a host flash controller) may be reduced, write throughput may be increased, and/or the storage device may have higher performance and/or life expectancy.

Figure 2:
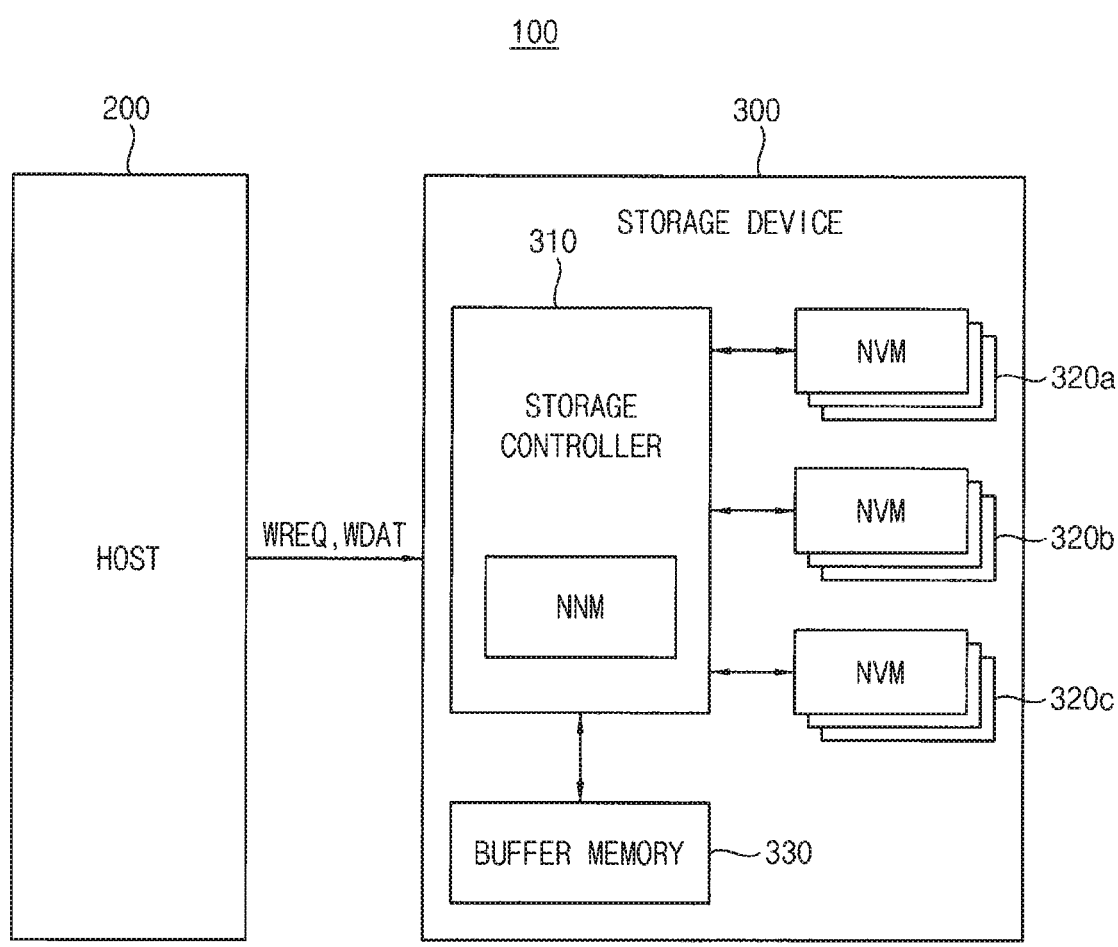
FIG. 2 is a block diagram illustrating a storage device and a storage system including the storage device according to some example embodiments.

FIG. 2 is a block diagram illustrating a storage device and a storage system including the storage device according to some example embodiments.

Referring to FIG. 2, a storage system 100 includes a host 200 and a storage device 300.

The host 200 controls overall operations of the storage system 100. Although not illustrated in FIG. 2, the host 200 may include a host processor and/or a host memory. The host processor may control an operation of the host. For example, the host processor may execute an operating system (OS). The host memory may store instructions and/or data that are executed and/or processed by the host processor.

The host 200 provides a data write request WREQ and target data WDAT to be written to the storage device 300. For example, although not illustrated in FIG. 2, the operating system executed by the host processor may include a file system for file management and/or a device driver for controlling peripheral devices including the storage device 300 at the operating system level. A file storing request by an application and/or an application program executed by the host processor and/or a program request by the file system may indicate the data write request WREQ.

The storage device 300 is accessed by the host 200, and/or operates in a multi-stream scheme independently of a control of the host 200. The storage device 300 may include a storage controller 310, a plurality of nonvolatile memories 320a, 320b and/or 320c, and/or a buffer memory 330.

The storage controller 310 may control an operation of the storage device 300, for example, a data write operation, based on a command and data that are received from the host 200.

The storage controller 310 may operate based on the method described with reference to FIG. 1. For example, the storage controller 310 includes a neural network model NNM that is pre-trained such that a plurality of data are written into a plurality of memory blocks included in the plurality of nonvolatile memories 320a, 320b and/or 320c based on which of a plurality of streams are associated with the plurality of data. The storage controller 310 receives the data write request WREQ and the target data WDAT to be written from the host 200, assigns, using the neural network model NNM, one of a plurality of streams selected for assignment of the target data WDAT by analyzing the target data WDAT, and/or writes the target data WDAT into a memory block corresponding to a stream selected for assignment of the target data WDAT such that data with a single stream are written into a single memory block. In other words, the storage controller 310 may control the storage device 300 such that the storage device 300 operates in the multi-stream scheme.

The plurality of nonvolatile memories 320a, 320b and/or 320c may store the plurality of data separately for each stream. For example, the plurality of nonvolatile memories 320a, 320b and/or 320c may store the target data WDAT, various user data, or the like. As described with reference to FIG. 23, each of the plurality of nonvolatile memories 320a, 320b and/or 320c may include a plurality of memory blocks.

In some example embodiments, each of the plurality of nonvolatile memories 320a, 320b and/or 320c may include a NAND flash memory. In other example embodiments, each of the plurality of nonvolatile memories 320a, 320b and/or 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and/or may temporarily store data stored in and/or to be stored into the plurality of nonvolatile memories 320a, 320b and/or 320c. For example, the buffer memory 330 may include at least one of various volatile memories, for example, a dynamic random access memory (DRAM), a static random access memory (SRAM), or the like.

In some example embodiments, the storage device 300 may be a solid state drive (SSD). In other example embodiments, the storage device 300 may be one of a universal flash storage (UFS), a multi media card (MMC), an embedded multi media card (eMMC), a secure digital (SD) card, a micro SD card, a memory stick, a chip card, a universal serial bus (USB) card, a smart card, a compact flash (CF) card, or the like.

In some example embodiments, the storage device 300 may be connected to the host 200 through a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and/or 320c to provide the block accessible interface to the host 200, for allowing the access by units of a memory block with respect to data stored in the plurality of nonvolatile memories 320a, 320b and/or 320c.

In some example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, and/or a robotic device. In other example embodiments, the storage system 100 may be any computing system, such as a personal computer (PC), a server computer, a workstation, a digital television, a set-top box, and/or a navigation system.

Figure 3:
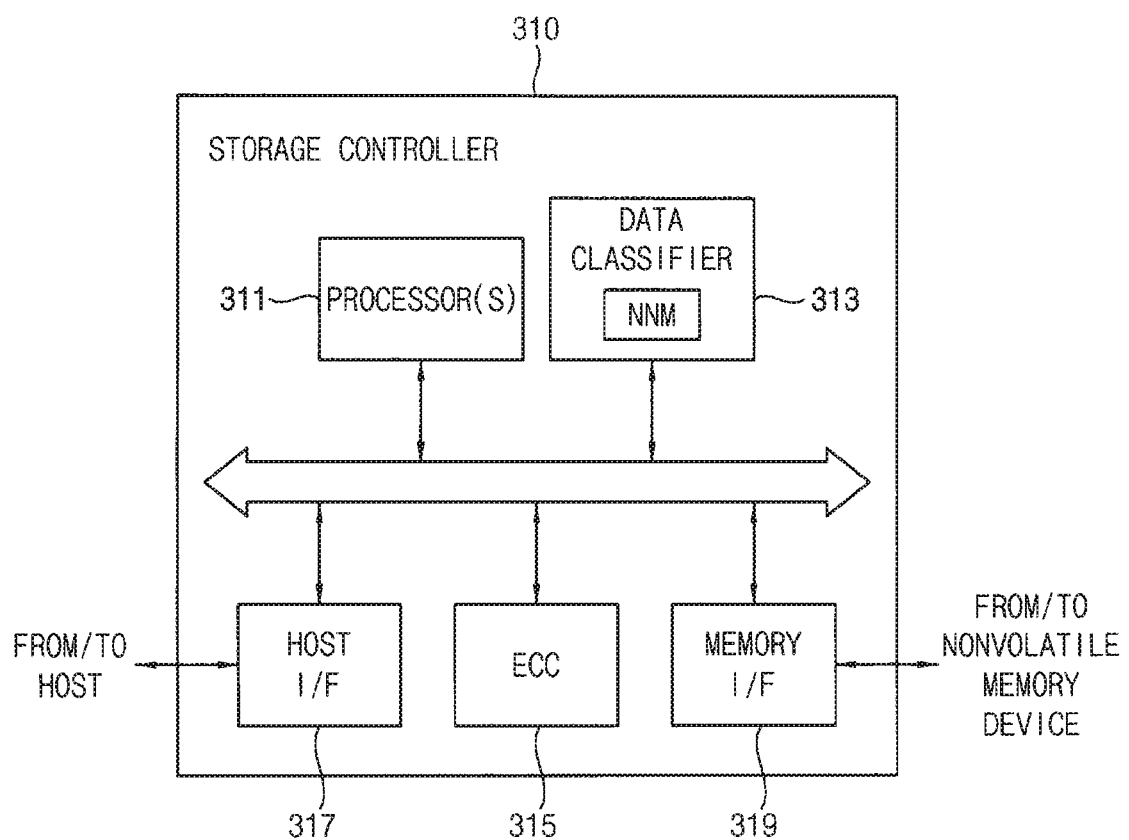
FIG. 3 is a block diagram illustrating an example of a storage controller included in a storage device according to some example embodiments.

FIG. 3 is a block diagram illustrating an example embodiment including a storage controller included in a storage device according to some example embodiments.

Referring to FIG. 3, a storage controller 310 may include at least one processor 311, a data classifier 313, an error correction code (ECC) block 315, a host interface 317 and/or a memory interface 319.

The processor 311 may control an operation of the storage controller 310 in response to a command received via the host interface 317 from a host (e.g., the host 200 in FIG. 2). In some example embodiments, the processor 311 may control respective components by employing firmware for operating a storage device (e.g., the storage device 300 in FIG. 2).

In some example embodiments, a data classifier 313, such as a neural network model NNM, may be pre-trained. The data classifier 313 may assign a stream to target data to be written (e.g., the target data WDAT in FIG. 2) by analyzing and/or classifying the target data such that the storage device 300 operates in the multi-stream scheme according to some example embodiments.

In some example embodiments, at least a part of the data classifier 313 may be implemented as hardware. For example, as illustrated in FIG. 3, the processor 311 and/or the data classifier 313 may be implemented as separate hardware. For another example, although not illustrated in FIG. 3, the processor 311 and/or the data classifier 313 may be implemented as one hardware.

In other example embodiments, at least a part of the data classifier 313 may be implemented as instruction codes and/or program routines (e.g., a software program) and/or may be stored in a memory (e.g., the nonvolatile memories 320a, 320b and/or 320c in FIG. 2). For example, the data classifier 313 and/or the neural network model NNM included in the data classifier 313 may be executed and/or driven by the processor 311.

In some example embodiments, an ECC block 315 for error correction may perform coded modulation using error correction codes such as a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), and/or a block coded modulation (BCM), and/or may perform ECC encoding and/or ECC decoding using above-described codes and/or other error correction codes.

In some example embodiments, a host interface 317 may provide physical connections between the host 200 and the storage device 300. The host interface 317 may provide an interface corresponding to a bus format of the host for communication between the host 200 and the storage device 300. In some example embodiments, the bus format of the host 200 may be a small computer system interface (SCSI) and/or a serial attached SCSI (SAS) interface. In other example embodiments, the host 200 may utilize a bus format such as USB, peripheral component interconnect (PCI) express (PCIe), advanced technology attachment (ATA), parallel ATA (PATA), serial ATA (SATA), and/or nonvolatile memory (NVM) express (NVMe).

The memory interface 319 may exchange data with nonvolatile memories (e.g., the nonvolatile memories 320a, 320b and/or 320c in FIG. 2). The memory interface 319 may transfer data to the nonvolatile memories 320a, 320b and/or 320c, and/or may receive data read from the nonvolatile memories 320a, 320b and/or 320c. In some example embodiments, the memory interface 319 may be connected to the nonvolatile memories 320a, 320b and/or 320c via one channel. In other example embodiments, the memory interface 319 may be connected to the nonvolatile memories 320a, 320b and/or 320c via two or more channels.

Figure 4:
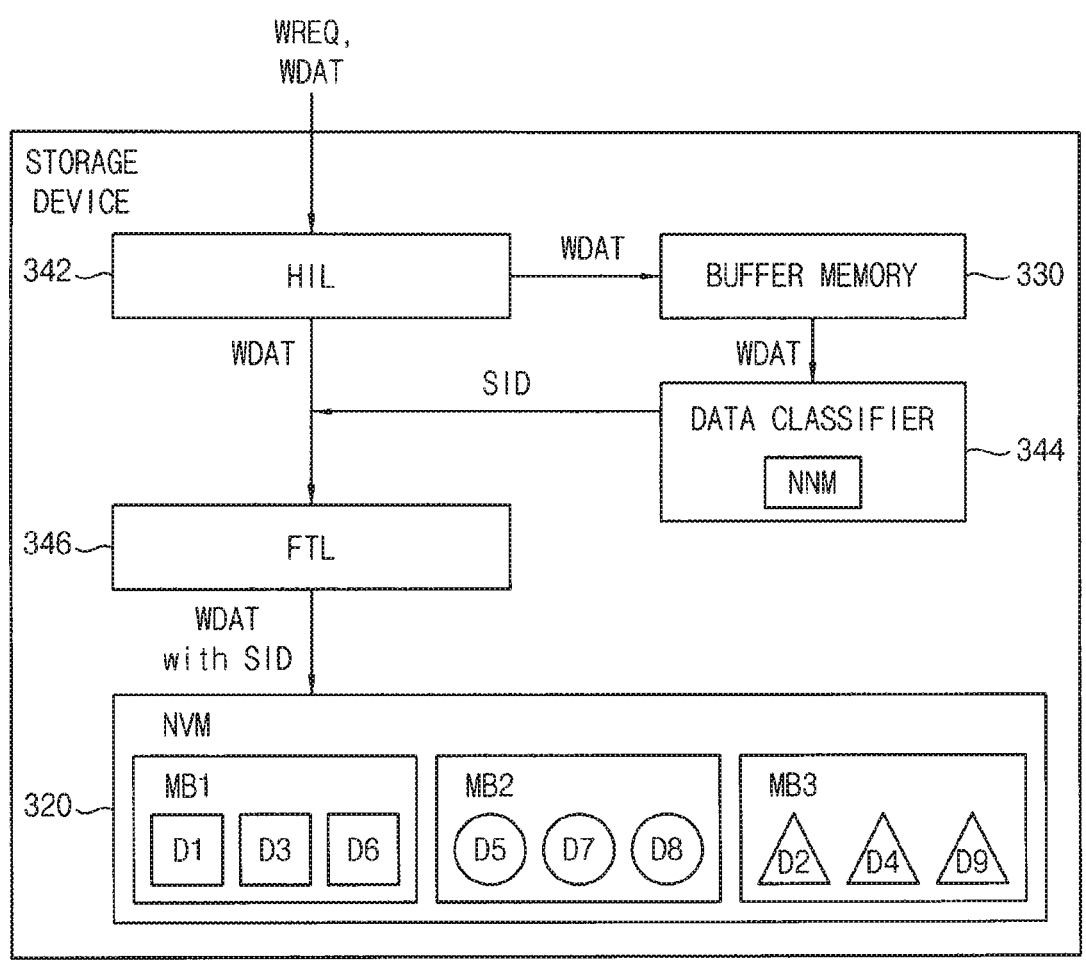
FIG. 4 is a diagram for describing a method of operating a storage device according to some example embodiments.

FIG. 4 is a diagram for describing a method of operating a storage device according to some example embodiments. FIG. 4 illustrates a software hierarchical structure and a storage space structure of the storage device 300 in FIG. 2.

Referring to FIG. 4, the storage device 300 may include a host interface layer (HIL) 342, a data classifier 344, a flash translation layer (FTL) 346, at least one nonvolatile memory 320 and the buffer memory 330.

The host interface layer 342 may receive various requests, signals and/or data provided from a host (e.g., the host 200 in FIG. 2). The flash translation layer 346 may translate a logical address provided from the host 200 into a physical address in the nonvolatile memory 320, and/or may manage data stored in the nonvolatile memory 320.

The nonvolatile memory 320 and/or the buffer memory 330 in FIG. 4 may be substantially the same as the nonvolatile memories 320a, 320b and/or 320c and/or the buffer memory 330 in FIG. 2, respectively. For example, the nonvolatile memory 320 may include a plurality of memory blocks MB1, MB2, MB3, . . . , and/or each of the plurality of memory blocks MB1, MB2, MB3, . . . may store only data of the same stream. For example, the memory block MB1 may store data D1, D3 and/or D6 that are assigned to a first stream, the memory block MB2 may store data D5, D7 and/or D8 that are assigned to a second stream, and the memory block MB3 may store data D2, D4 and/or D9 that are assigned to a third stream. For convenience of illustration, the data D1, D3 and D6 that are assigned to the first stream are illustrated by rectangles, the data D5, D7 and D8 that are assigned to the second stream are illustrated by circles, and the data D2, D4 and D9 that are assigned to the third stream are illustrated by triangles in FIG. 4. In some example embodiments, a buffer memory 330 may temporarily store data stored in and/or to be stored into the nonvolatile memory 320.

In some example embodiments, the data classifier 344 in FIG. 4 may be substantially the same as the data classifier 313 in FIG. 3, and/or may include a neural network model NNM. The neural network model NNM in FIG. 4 may be substantially the same as the neural network model NNM in FIGS. 2 and/or 3. In other example embodiments, the data classifier 344 in FIG. 4 may differ from the data classifier 313 in FIG. 3. In some example embodiments, a data classifier 344 such as a neural network model NNM may be pre-trained such that a plurality of data are written into the plurality of memory blocks MB1, MB2, MB3, . . . based on which of a plurality of streams are associated with the plurality of data. For example, a neural network model NNM may be a classification model, an input of the neural network model NNM may be raw data (e.g., target data WDAT), and/or an output of the neural network model NNM may be a stream ID SID (e.g., a numeric value) of the stream to which the target data WDAT is to be assigned. At least a part of the raw data (e.g., the target data WDAT) may be the input of the neural network model NNM.

The method of operating the storage device of FIG. 1 is described with reference to FIG. 4.

First, the host interface layer 342 may receive a data write request WREQ and the target data WDAT to be written that are provided from the host 200. The target data WDAT may be temporarily stored in the buffer memory 330 before being provided to the data classifier 344 and/or the flash translation layer 342.

In some example embodiments, the data classifier 344 may receive the target data WDAT from the buffer memory 330, and/or may analyze and/or classify, using the neural network model NNM, the target data WDAT, which is the raw data, without any other information to predict, assign the corresponding stream.

In some example embodiments, the data classifier 344 may include one or more neural network models NNM that may be configured, for example, as a single-layer perceptron (SLP), a multi-layer perceptron (MLP), a convolutional neural network (CNN), a deep neural network (DNN), a recurrent neural network (RNN), or the like. In other example embodiments, the data classifiers 344 may utilize other classification models, data structures, and/or adaptive computing techniques, including (without limitation) Bayesian statistical classifiers, genetically evolved algorithms, fuzzy logic systems, and rule-based and/or heuristic classifiers such as decision trees, including combinations thereof.

The flash translation layer 346 may receive the target data WDAT and/or the stream assigned by the data classifier 344, and/or may perform a data write operation (e.g., a NAND operation) based on the target data WDAT and/or the stream. For example, the target data WDAT may be written into the memory block MB1 when the stream to which the target data has been assigned by the data classifier is the first stream, the target data WDAT may be written into the memory block MB2 when the stream to which the target data has been assigned by the data classifier is the second stream, and/or the target data WDAT may be written into the memory block MB3 when the stream to which the target data has been assigned by the data classifier is the third stream.

In some example embodiments, when the storage device 300 operates and/or is driven in the multi-stream scheme, a host 200 may form a relationship between the stream and corresponding information into a stream mapping table using a variety of information, such as file information, process information, and/or file system information, and/or a storage device 300 may select the stream by analyzing and/or classifying the target data WDAT using the neural network model NNM. In other example embodiments, a host 200 and/or storage device 300 may not include the stream mapping table.

Figure 5A:
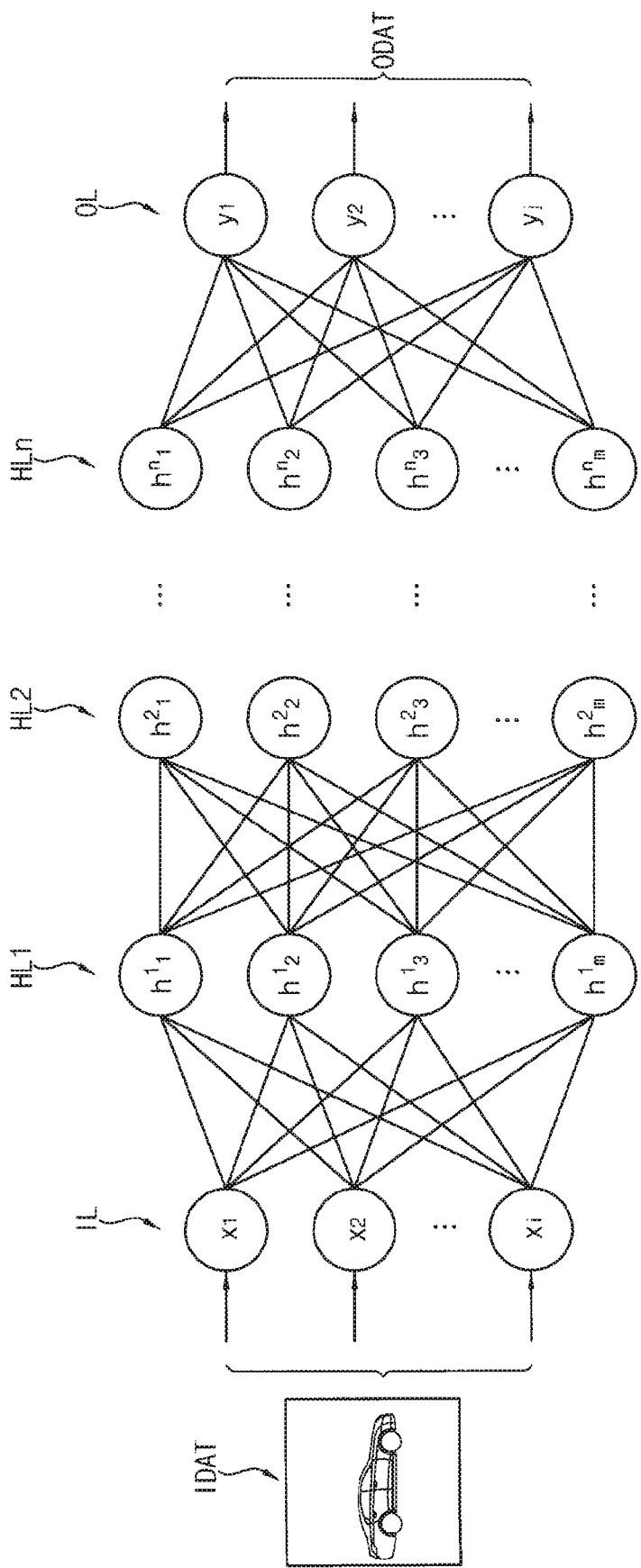
FIGS. 5A and 5B are diagrams for describing an example of a neural network model included in a storage device according to some example embodiments.
Figure 5B:
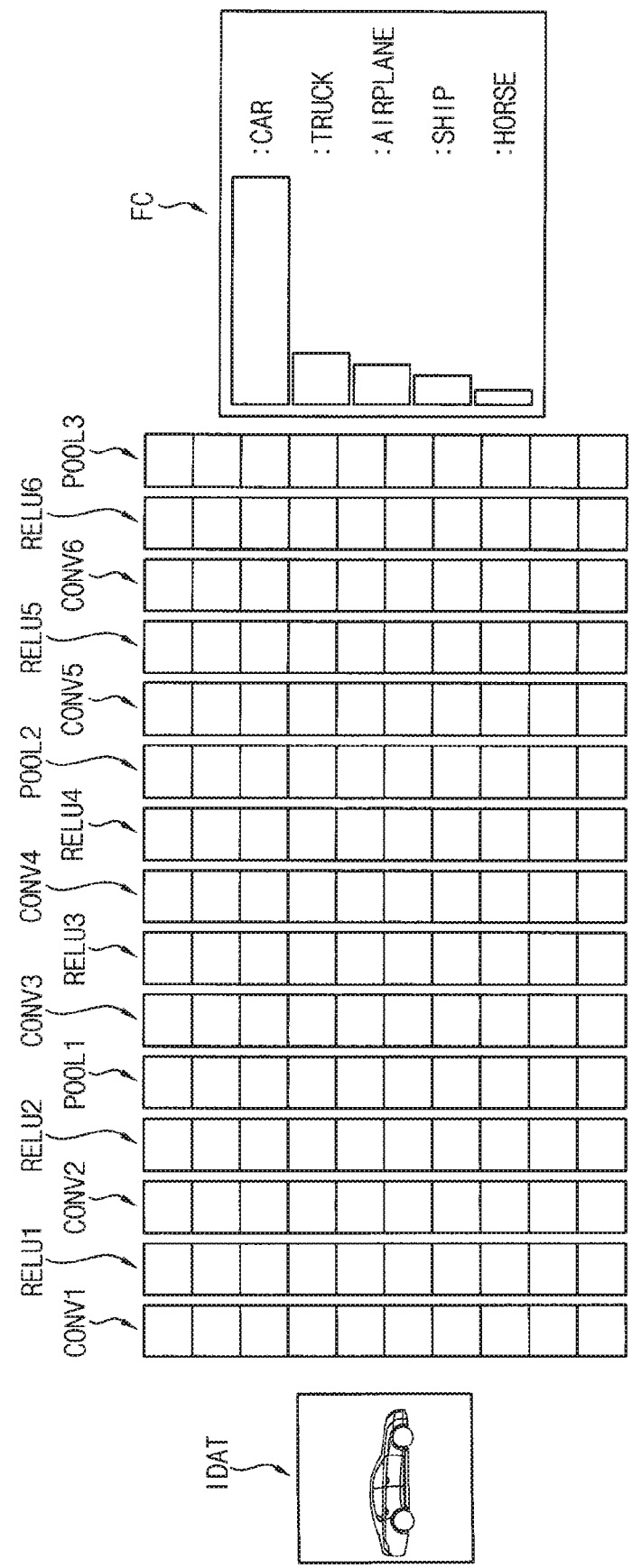

FIGS. 5A and 5B are diagrams for describing an example of a neural network model included in a storage device according to some example embodiments.

Referring to FIG. 5A, a general neural network may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1, x_2, \ldots, x_i$ such that each element of the input data IDAT is input to a respective one of the input nodes $x_1$, $x_2, \ldots, x_i$.

The plurality of hidden layers HL1, HL2, HLn may include n hidden layers, where n is a natural number, and may include a plurality of hidden nodes $h^1_1, h^1_2, h^1_3, \ldots, h^1_m, h^2_1, h^2_2, h^2_3, \ldots, h^2_m, h''_1, h''_2, h''_3, \ldots, h''_m$. For example, the hidden layer HL1 may include m hidden nodes $h^1_1, h^1_2, h^1_3, \ldots, h^1_m$, the hidden layer HL2 may include m hidden nodes $h^2_1, h^2_2, h^2_3, \ldots, h^2_m$, and the hidden layer HLn may include m hidden nodes $h''_1, h''_2, h''_3, \ldots, h''_m$, where m is a natural number.

The output layer OL may include j output nodes $y_1$, $y_2, \ldots, y_j$, where j is a natural number. Each of the output nodes $y_1, y_2, \ldots, y_j$ may correspond to a respective one of classes to be categorized. The output layer OL may output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 5A may be represented by information on branches (or connections) between nodes illustrated as lines, and a weighted value assigned to each branch, which is not illustrated. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation and/or calculation on the received output, and/or may output a result of the computing operation, computation and/or calculation as an output to a next node (e.g., the node $h^2_1$). Each node may calculate a value to be output by applying the input to a specific function, for example, a nonlinear function.

Generally, the structure of the neural network is set in advance, and/or the weighted values for the connections between the nodes are set appropriately using data having an identified answer of which class the data belongs to. The data with the identified answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

In some example embodiments, a neural network, such as SLP and/or MLP, may have a structure such as illustrated in FIG. 5A.

Some neural networks, such as illustrated in FIG. 5A, may not be suitable for handling input image data (or input sound data) because each node (e.g., the node $h^1_1$) is connected to all nodes of a previous layer (e.g., the nodes $x_1, x_2, \ldots, x_i$, included in the layer IL) and then the number of weighted values drastically increases as the size of the input image data increases. Thus, a convolutional neural network, which is implemented by combining the filtering technique with the general neural network, has been researched such that two-dimensional image (e.g., the input image data) is efficiently trained by the convolutional neural network.

Referring to FIG. 5B, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and/or FC.

Unlike a general neural network, each layer of the convolutional neural network may have three dimensions of width, height and/or depth, and thus data that is input to each layer may be volume data having three dimensions of width, height and/or depth. For example, if an input image in FIG. 5B has a size of 32 widths (e.g., 32 pixels) and 32 heights and three color channels R, G and B, input data IDAT corresponding to the input image may have a size of 32*32*3. The input data IDAT in FIG. 5B may be referred to as input volume data and/or input activation volume.

Convolutional layers CONV1, CONV2, CONV3, CONV4, CONV5 and/or CONV6 may perform a convolutional operation on input volume data. In an image processing, the convolutional operation represents an operation in which image data is processed based on a mask with weighted values and/or an output value is obtained by multiplying input values by the weighted values and/or adding up the total multiplied values. The mask may be referred to as a filter, window or kernel.

In some example embodiments, parameters of each convolutional layer may include a set of learnable filters. Every filter may be small spatially (along width and/or height), but may extend through the full depth of an input volume. For example, during the forward pass, each filter may be slid (more precisely, convolved) across the width and/or height of the input volume, and dot products may be computed between the entries of the filter and the input at any position. As the filter is slid over the width and/or height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

RELU layers RELU1, RELU2, RELU3, RELU4, RELU5 and/or RELU6 may perform a rectified linear unit operation that corresponds to an activation function defined by, for example, a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Pooling layers POOL1, POOL2 and/or POOL5 may perform a down-sampling operation on input volume data along spatial dimensions of width and/or height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and/or height of volume data decreases, and/or a depth of volume data is maintained).

Some example embodiments may include neural networks in which one convolutional layer (e.g., CONV1) and/or one RELU layer (e.g., RELU1) may form a pair of CONV/RELU layers in the convolutional neural network, pairs of the CONV/RELU layers may be repeatedly arranged in the convolutional neural network, and/or the pooling layer may be periodically inserted in the convolutional neural network, thereby reducing a spatial size of image and/or extracting a characteristic of an image.

In some example embodiments, an output layer and/or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and/or the down-sampling operation are repeated. For example, the fully-connected layer FC may represent probabilities that the input volume data IDAT corresponds to a car, a truck, an airplane, a ship and a horse.

In some example embodiments, the types and number of layers included in the convolutional neural network may not be limited to an example described with reference to FIG. 5B and may be changed according to some example embodiments. In addition, although not illustrated in FIG. 5B, the convolutional neural network may further include other layers such as a softmax layer for converting score values corresponding to predicted results into probability values, a bias adding layer for adding at least one bias, or the like. In some example embodiments, in addition to CNN, a neural network, such as DNN, may have a structure such as illustrated in FIG. 5B.

In view of the foregoing discussion of data classifiers such as neural networks, the following description presents some uses of data classifiers such as neural networks to assign target data to streams and/or memory blocks in accordance with some example embodiments.

Figure 6:
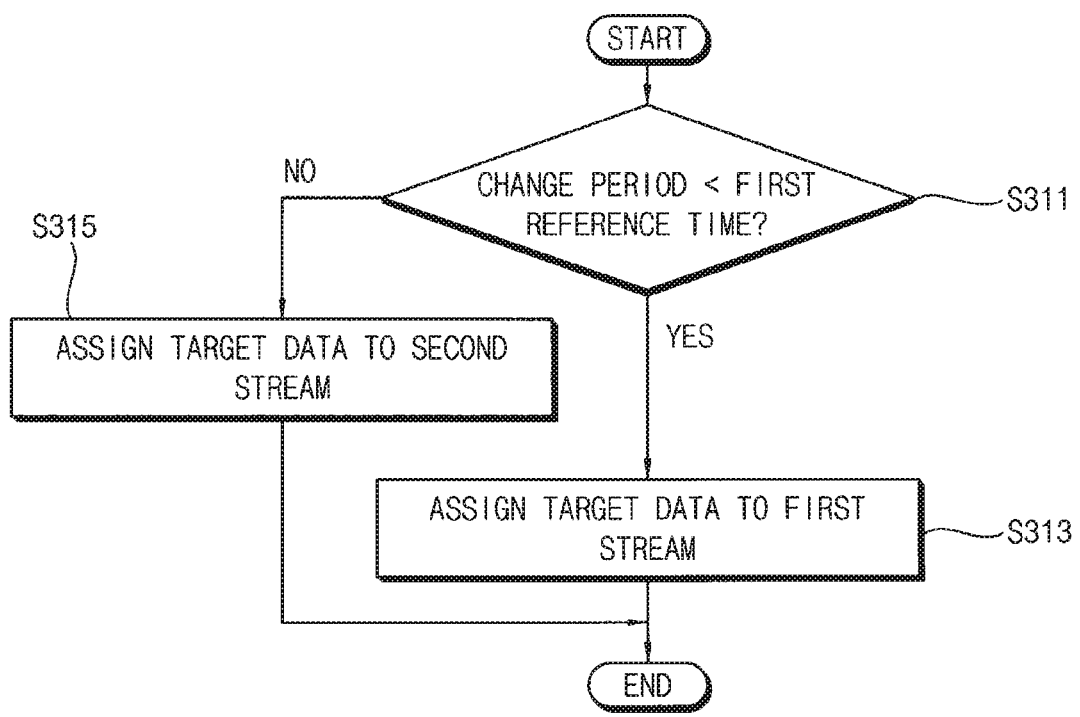
FIG. 6 is a flowchart illustrating an example of assigning one of a plurality of streams to target data in FIG. 1 according to some example embodiments.

FIG. 6 is a flowchart illustrating an example of assigning one of a plurality of streams to target data in FIG. 1. FIG. 7 is a diagram for describing an operation of assigning one of a plurality of streams to target data of FIG. 6.

Figure 7:
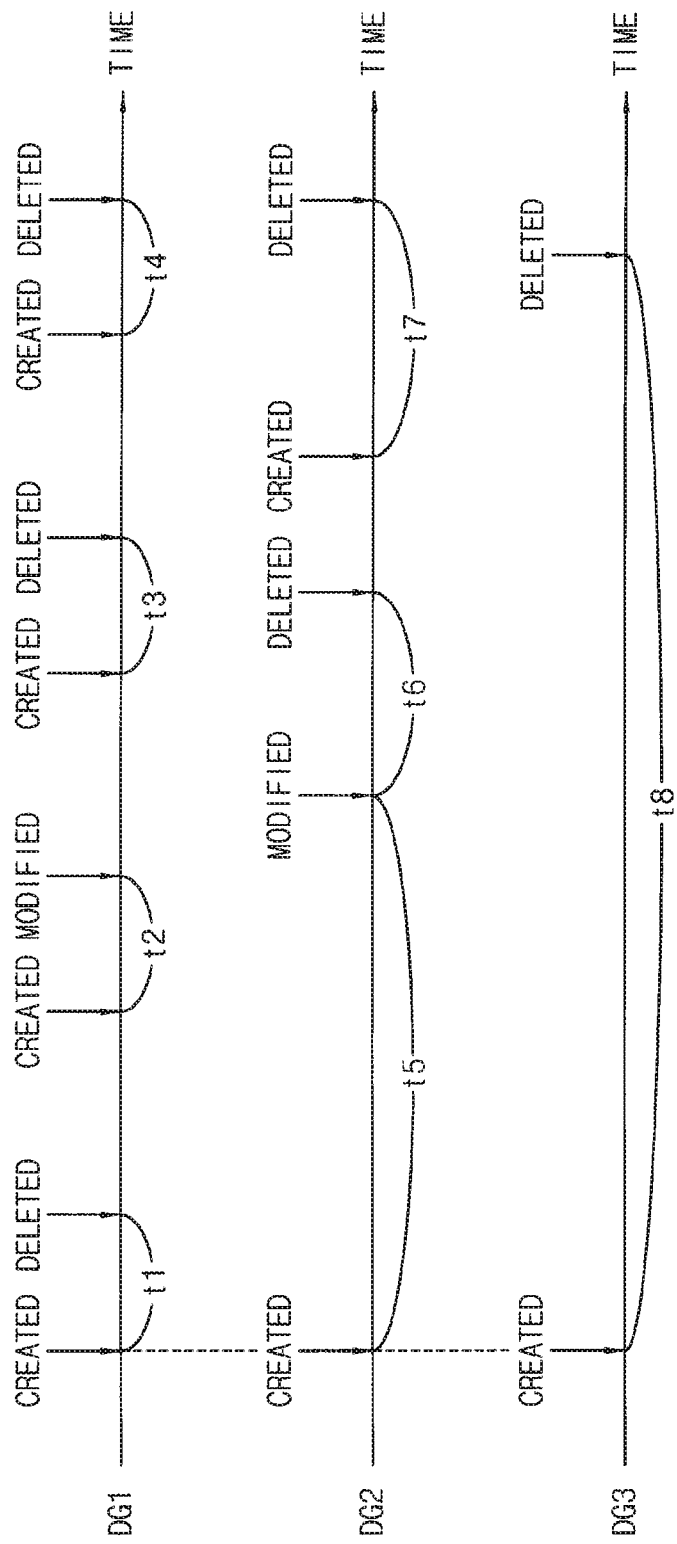
FIG. 7 is a diagram for describing an operation of assigning one of a plurality of streams to target data of FIG. 6 according to some example embodiments.

Referring to FIGS. 1, 6 and 7, in some example embodiments, when assigning one of the plurality of streams selected for assignment of the target data (operation S300), the plurality of streams may represent a lifetime, which is a change period of the plurality of data written in the plurality of memory blocks. In other words, a data property for assigning the stream, e.g., a data property for classifying the target data may be associated with a lifetime which represents a change period of data.

For example, when it is analyzed that a lifetime or change period of the target data is a first time shorter than a first reference time (operation S311: YES), a first stream selected from the plurality of streams may be selected for assignment of the target data (operation S313). When it is analyzed that the lifetime or change period of the target data is a second time longer than or equal to the first reference time (operation S311: NO), a second stream selected from the plurality of streams may be selected for assignment of the target data (operation S315).

In FIG. 7, change periods of data having three different types of lifetime or change periods according to the passage of time are illustrated. A first group of data DG1 may correspond to a first lifetime grade, and/or may be created, modified, and/or deleted with time intervals t1, t2, t3 and t4. A second group of data DG2 may correspond to a second lifetime grade, and/or may be created, modified, and/or deleted with time intervals t5, t6 and t7, each of which may be longer than each of t1, t2, t3 and t4. A third group of data DG3 may correspond to a third lifetime grade, and/or may be created, modified, and/or deleted with a time interval t8, which may be longer than each of t5, t6 and t7. The second group of data DG2 may have a longer change period than the first group of data DG1, and/or the third group of data DG3 may have a longer change period than the second group of data DG2.

In some example embodiments, a lifetime indicating a change period of data may be represented by lifetime grades produced by classifying the change period into N grades (N is a natural number) according to the length of the change period. Accordingly, data pieces, which have similar lifetimes while not having completely the same change period, may be classified into one group. For example, FIG. 7 illustrates an example where N=3, data changed every 1 hour and data changed every 1 hour 10 minutes may be classified as a first grade, data changed every 4 hours and data changed every 4 hours 40 minutes may be classified as a second grade, and data changed every 10 hours may be classified as a third grade. As the classification result, grade comparison may be performed, such that the lifetime of data of the first grade is shorter than that of data of the second grade and/or the lifetime of data of the third grade is longer than that of the data of the first grade.

Figure 8:
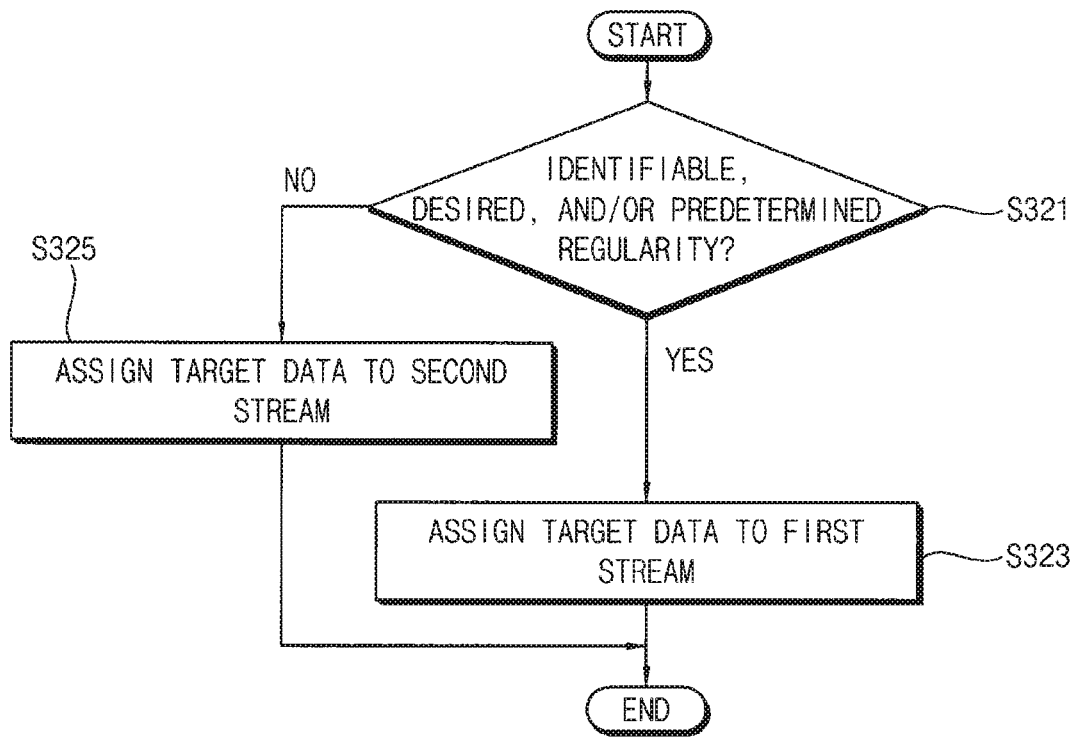
FIG. 8 is a flowchart illustrating another example of assigning one of a plurality of streams to target data in FIG. 1 according to some example embodiments.
Figure 9A:
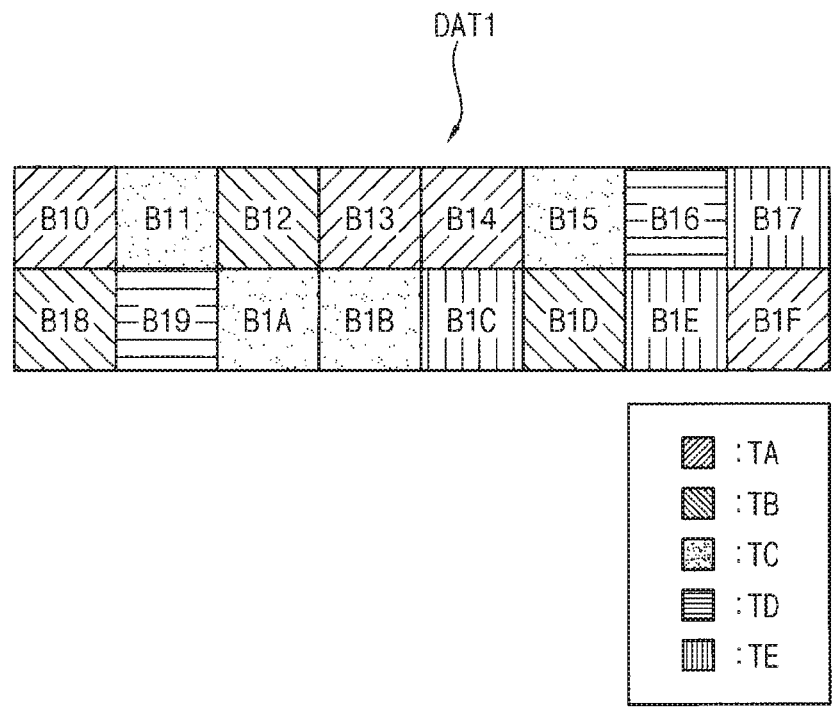
FIGS. 9A and 9B are diagrams for describing an operation of assigning one of a plurality of streams to target data of FIG. 8 according to some example embodiments.
Figure 9B:
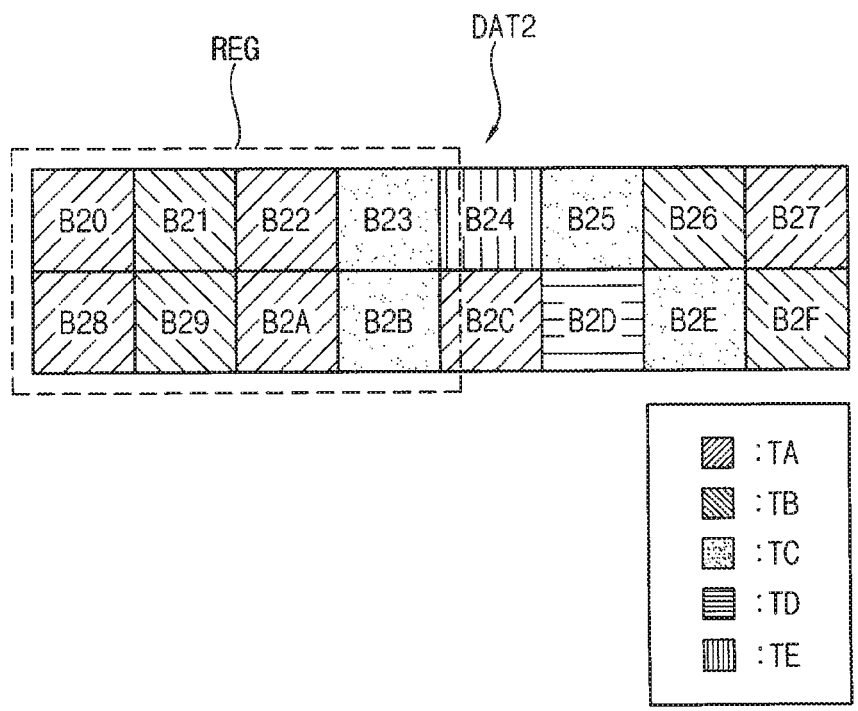

FIG. 8 is a flowchart illustrating another example of assigning the target data to one of a plurality of streams in FIG. 1. FIGS. 9A and 9B are diagrams for describing an operation of assigning one of a plurality of streams to target data of FIG. 8.

Referring to FIGS. 1, 8, 9A and 9B, and in some example embodiments, when assigning one of the plurality of streams selected for assignment of the target data (operation S300), the plurality of streams may represent a regularity of the plurality of data written in the plurality of memory blocks. In other words, a data property for assigning the target data to the stream, e.g., a data property for classifying the target data, may be associated with a regularity of data.

For example, when it is analyzed that a plurality of data bits included in the target data has at least a regularity (e.g., having an identifiable, desired, and/or predetermined regularity) (operation S321: YES), a first stream selected from the plurality of streams may be selected for assignment of the target data (operation S323). For example, the plurality of data bits included in the target data may have a regularity that at least meets a regularity threshold. When it is analyzed that the plurality of data bits included in the target data has a randomness and/or does not have an identifiable, desired, and/or predetermined regularity (e.g., not having a regularity that is identifiable and/or that at least meets a regularity threshold) (operation S321: NO), a second stream selected from the plurality of streams may be selected for assignment of the target data (operation S325).

As illustrated in FIG. 9A, data DAT1 may include a plurality of data bits B10, B11, B12, B13, B14, B15, B16, B17, B18, B19, B1A, B1B, B1C, B1D, B1E and B1F. For example, each data bit may be represented by a hexadecimal code and/or may have one of various types TA, TB, TC, TD and TE. The data DAT1 of FIG. 9A may be randomly arranged with the various types TA-TE of the bits B10-B1F without a regularity.

As illustrated in FIG. 9B, data DAT2 may include a plurality of data bits B20, B21, B22, B23, B24, B25, B26, B27, B28, B29, B2A, B2B, B2C, B2D, B2E and B2F each of which has one of the various types TA, TB, TC, TD and TE. The data DAT2 of FIG. 9B may have a regularity REG in which a pattern having a type sequence and/or type order of TA, TB, TA and/or TC is repeated. For example, in the data DAT2 of FIG. 9B, the four bits B20-B23 may have the type sequence of TA, TB, TA and TC, the next four bits B24-B27 may have a different type order, and the next four bits B28-B2B may again have the type sequence of TA, TB, TA and TC.

In some example embodiments, when the target data is the data DAT2 of FIG. 9B, the neural network model NNM may determine that the target data has an identifiable, desired, and/or predetermined regularity, and/or may assign the target data to the first stream. When the target data is the data DAT1 of FIG. 9A, the neural network model NNM may determine that the target data has the randomness without the identifiable, desired, and/or predetermined regularity, and/or may assign the target data to the second stream.

Figure 10:
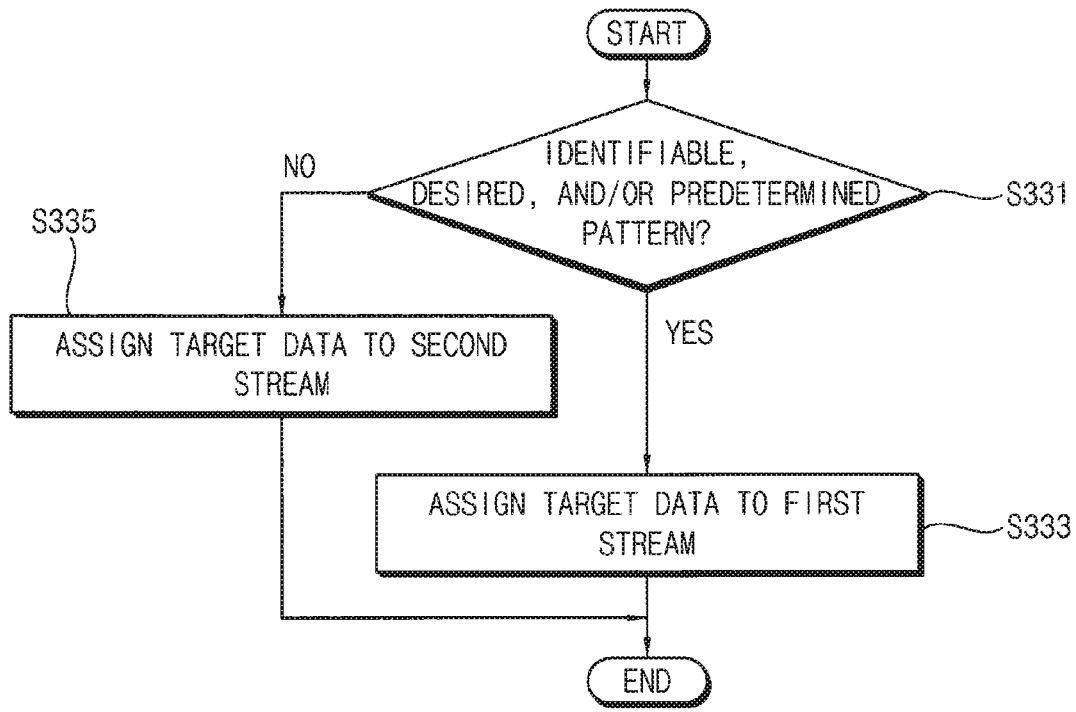
FIG. 10 is a flowchart illustrating still another example of assigning one of a plurality of streams to target data in FIG. 1 according to some example embodiments.
Figure 11:
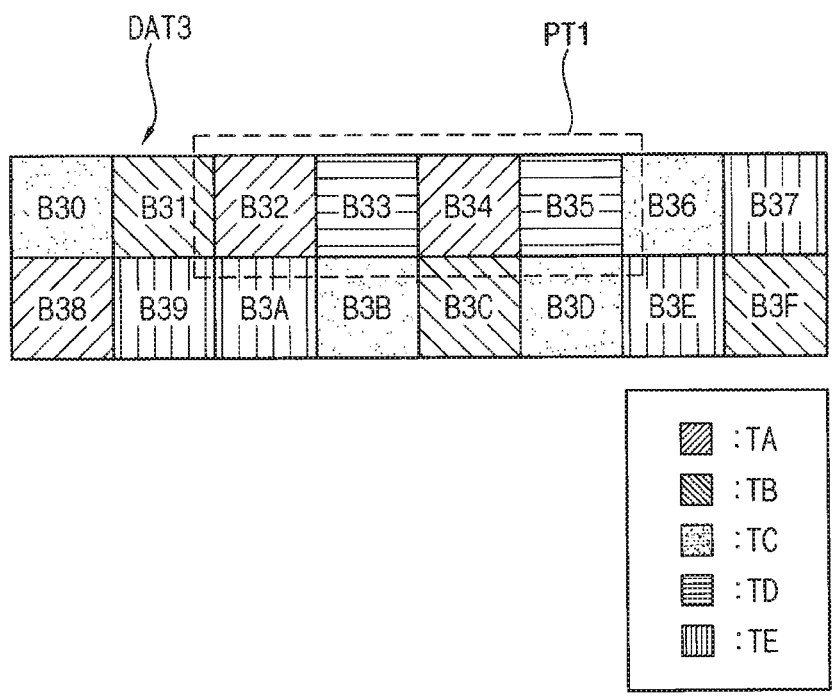
FIG. 11 is a diagram for describing an operation of assigning one of a plurality of streams to target data of FIG. 10 according to some example embodiments.

FIG. 10 is a flowchart illustrating still another example of assigning the target data to one of a plurality of streams in FIG. 1. FIG. 11 is a diagram for describing an operation of assigning the target data to one of a plurality of streams of FIG. 10.

Referring to FIGS. 1, 10 and 11, in some example embodiments, when assigning the target data to one of the plurality of streams (operation S300), the plurality of streams may represent a regularity of the plurality of data written in the plurality of memory blocks, similarly to an example of FIG. 8.

For example, when it is analyzed that the target data has a pattern (e.g., an identifiable, desired, and/or predetermined pattern) (operation S331: YES), a first stream selected from the plurality of streams may be selected for assignment of the target data (operation S333). When it is analyzed that the target data does not have the identifiable, desired, and/or predetermined pattern (operation S331: NO), a second stream selected from the plurality of streams may be selected for assignment of the target data (operation S335).

As illustrated in FIG. 11, data DAT3 may include a plurality of data bits B30, B31, B32, B33, B34, B35, B36, B37, B38, B39, B3A, B3B, B3C, B3D, B3E and B3F, each of which may one of the various types TA, TB, TC, TD and TE. The data DAT3 of FIG. 11 may have a pattern PT1 having a type sequence of TA, TD, TA and TD.

In some example embodiments, when the target data is the data DAT3 of FIG. 11, the neural network model NNM may determine that the target data has the identifiable, desired, and/or predetermined pattern, and/or may assign the target data to the first stream. When the target data is the data DAT1 of FIG. 9A, the neural network model NNM may determine that the target data does not have the identifiable, desired, and/or predetermined pattern, and/or may assign the target data to the second stream.

Figure 12:
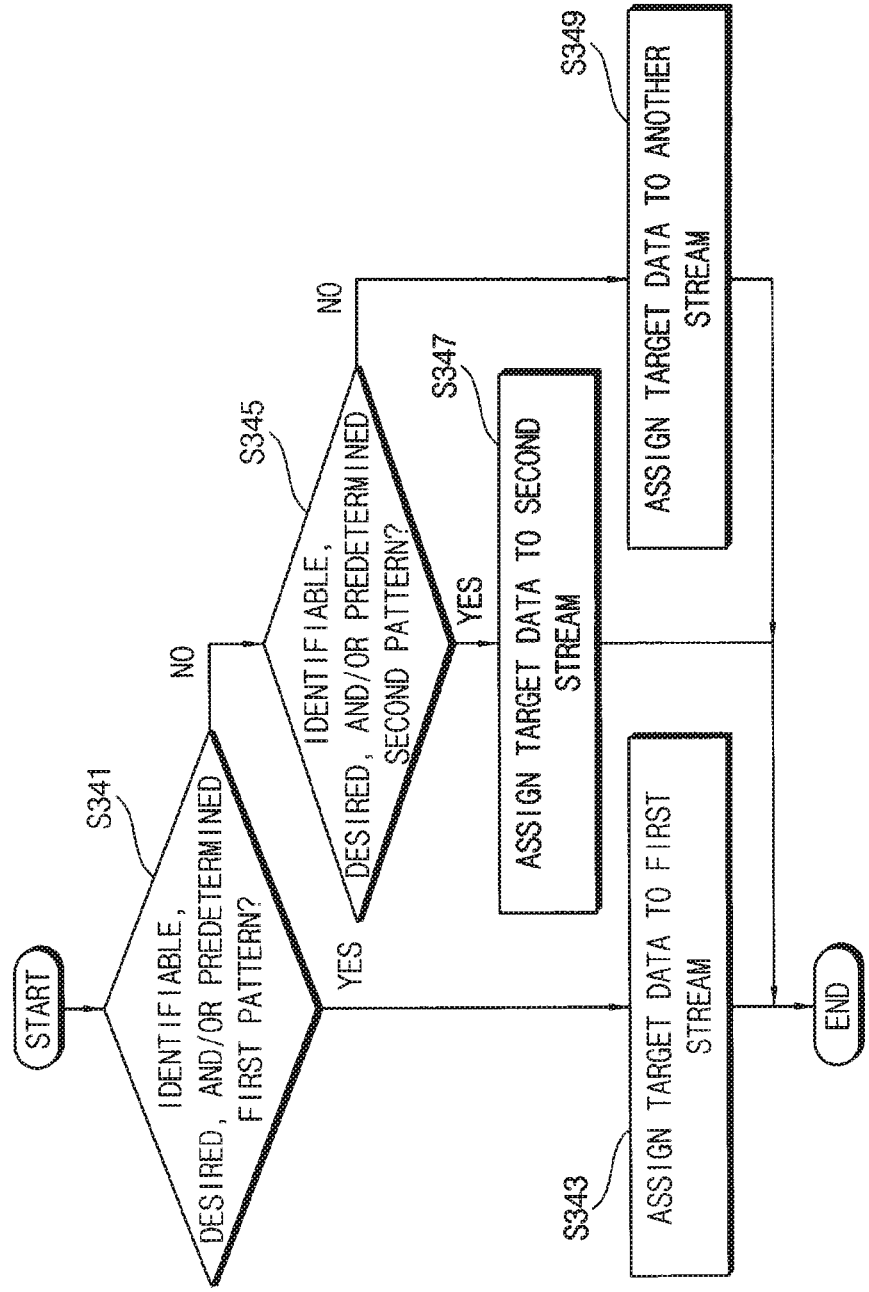
FIG. 12 is a flowchart illustrating still another example of assigning one of a plurality of streams to target data in FIG. 1 according to some example embodiments.
Figure 13:
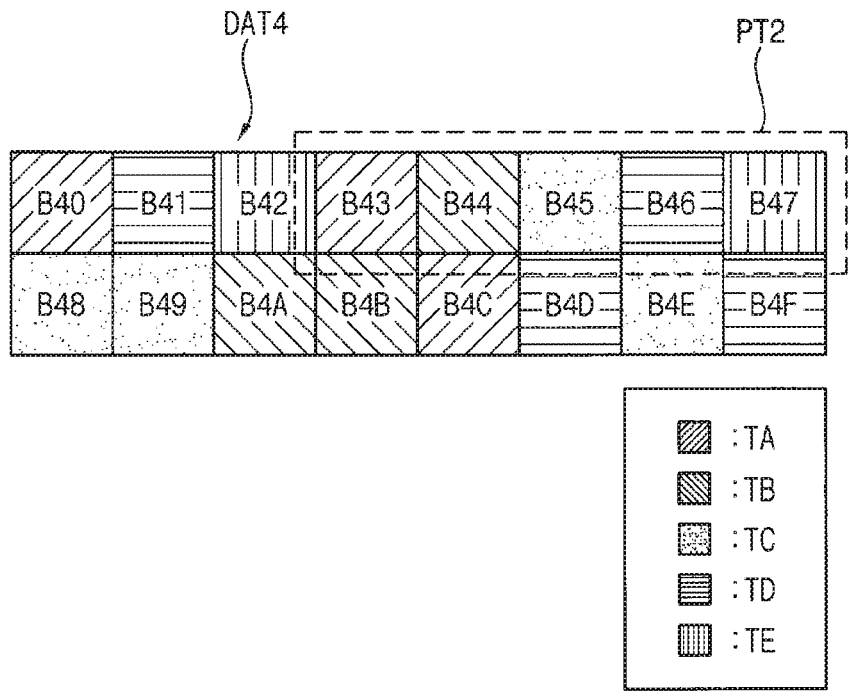
FIG. 13 is a diagram for describing an operation of assigning one of a plurality of streams to target data of FIG. 12 according to some example embodiments.

FIG. 12 is a flowchart illustrating still another example of assigning the target data to one of a plurality of streams in FIG. 1. FIG. 13 is a diagram for describing an operation of assigning the target data to one of a plurality of streams of FIG. 12.

Referring to FIGS. 1, 12 and 13, in some example embodiments, when assigning the target data to one of the plurality of streams (operation S300), the plurality of streams may represent a regularity of the plurality of data written in the plurality of memory blocks, similarly to examples of FIGS. 8 and 10.

For example, when it is analyzed that the target data has an identifiable, desired, and/or predetermined first pattern (operation S341: YES), a first stream among the plurality of streams may be selected for assignment of the target data (operation S343). When it is analyzed that the target data does not have the first pattern (operation S341: NO), and/or when it is analyzed that the target data has an identifiable, desired, and/or predetermined second pattern (operation S345: YES), a second stream may be selected from the plurality of streams for assignment of the target data (operation S347). When it is analyzed that the target data does not have both the first pattern and the second pattern (operation S341: NO & operation S345: NO), a third stream other than the first stream and the second stream may be selected for assignment of the target data (operation S349).

As illustrated in FIG. 13, data DAT4 may include a plurality of data bits B40, B41, B42, B43, B44, B45, B46, B47, B48, B49, B4A, B4B, B4C, B4D, B4E and B4F, each of which may have one of the various types TA, TB, TC, TD and TE. The data DAT4 of FIG. 13 may have a pattern PT2 having a type sequence of TA, TB, TC, TD and TE.

In some example embodiments, when the target data is the data DAT3 of FIG. 11, the neural network model NNM may determine that the target data has the first pattern, and/or may assign the target data to the first stream. When the target data is the data DAT4 of FIG. 13, the neural network model NNM may determine that the target data has the second pattern, and/or may assign the target data to the second stream. In other cases, the neural network model NNM may assign the target data to the third stream.

Although FIGS. 9A, 9B, 11 and 13 illustrate that the identifiable, desired, and/or predetermined regularity and/or identifiable, desired, and/or predetermined pattern are associated with a specific type sequence and/or type order, some example embodiments are not limited thereto. For example, the identifiable, desired, and/or predetermined regularity and/or identifiable, desired, and/or predetermined pattern may be associated with whether a specific hexadecimal code is included or not, whether a specific parameter is included or not, and the like.

Although FIGS. 6, 8, 10 and 12 illustrate that the target data is classified into two or three groups according to data properties (e.g., identifiable, desired, and/or predetermined criteria of the target data) and/or one of two or three streams is selected for assignment of the write data in correspondence thereto, some example embodiments are not limited thereto. For example, the number of identifiable, desired, and/or predetermined data properties and/or the number of streams in correspondence thereto may be changed according to some example embodiments.

In some example embodiments, a data type of the target data may be used as the data property by which target data is assigned to one of the plurality of streams. For example, journal data and/or commit data associated with an operation of the storage device, and the metadata associated with an operation of the file system may be analyzed as data having a relatively short lifetime, data having the identifiable, desired, and/or predetermined regularity and/or data having the identifiable, desired, and/or predetermined pattern. In some example embodiments, general user data such as video data, image data and/or voice data may be analyzed as data having a relatively long lifetime, data having the randomness and/or data having no identifiable, desired, and/or predetermined pattern.

Figure 14:
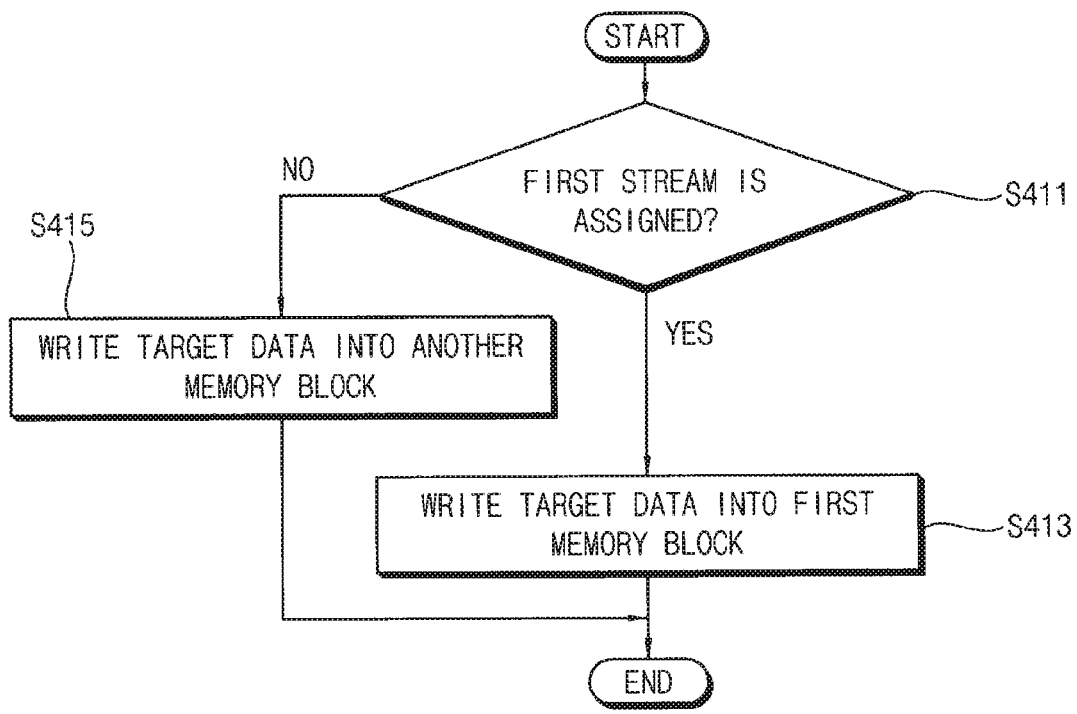
FIGS. 14, 15 and 16 are flowcharts illustrating an example of writing target data into a memory block corresponding to streams selected for assignment of target data in FIG. 1 according to some example embodiments.
Figure 15:
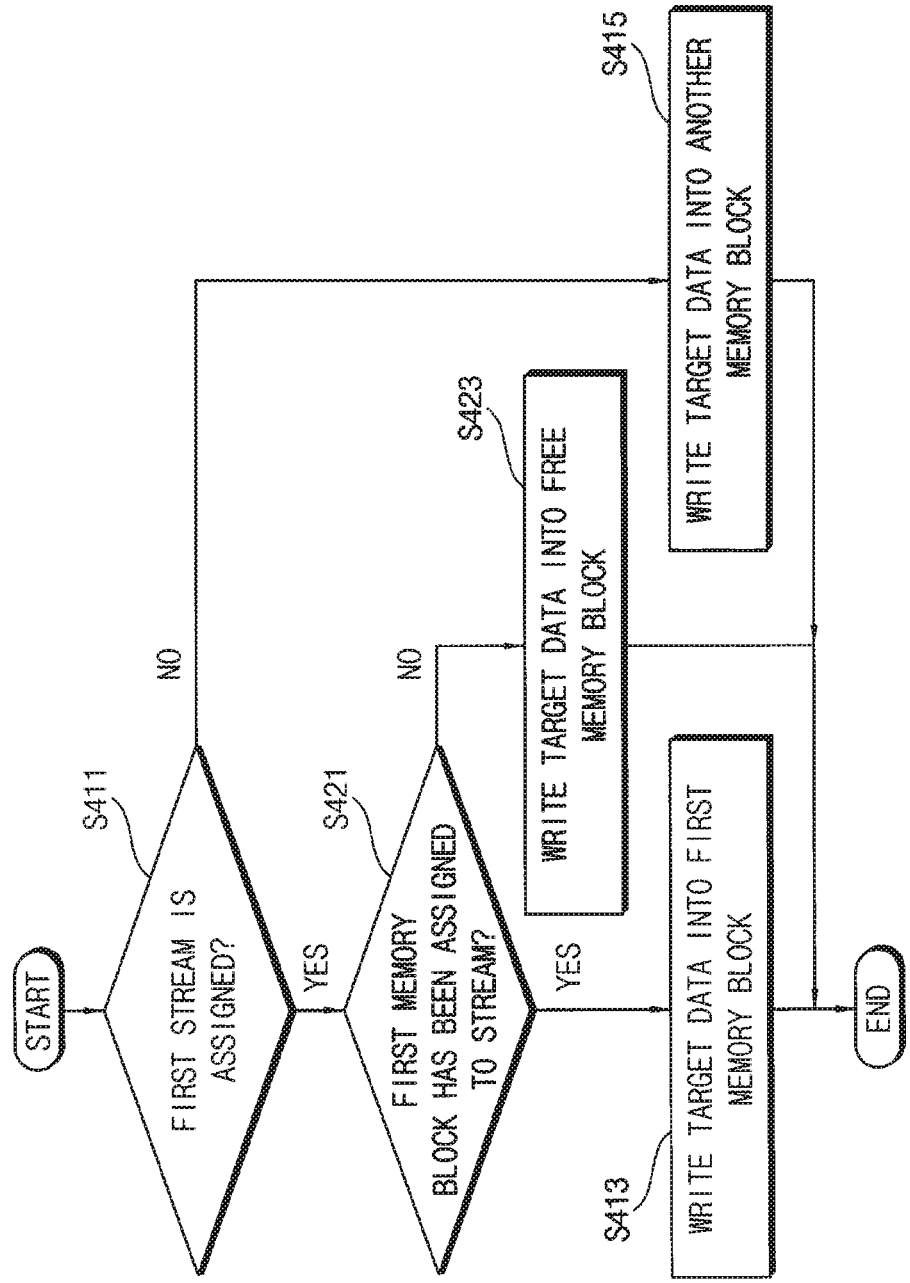
Figure 16:
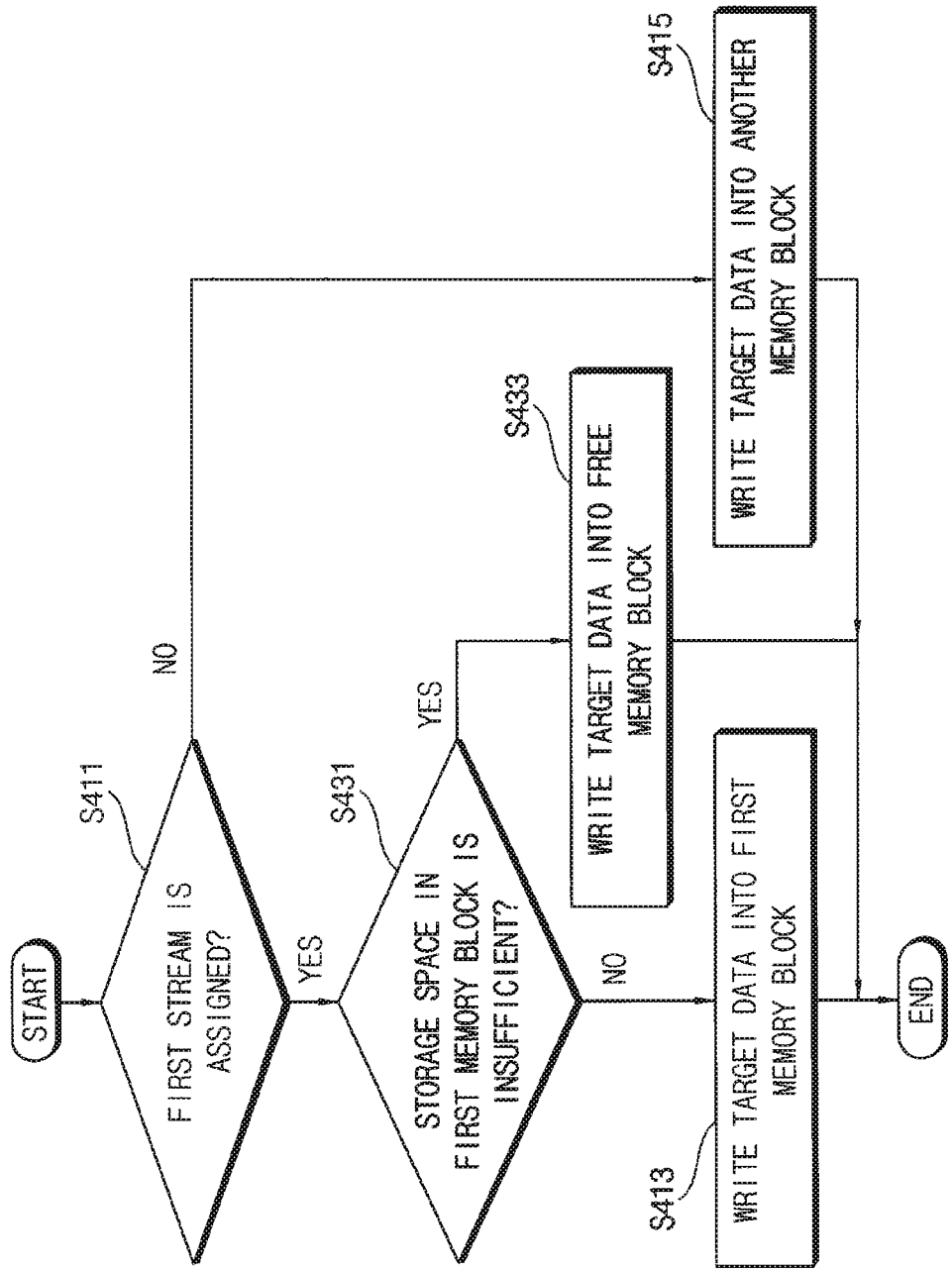

FIGS. 14, 15 and 16 are flowcharts illustrating an example of writing target data into a memory block corresponding to a stream selected for assignment of the target data in FIG. 1.

Referring to FIGS. 1 and 14, in some example embodiments, when writing the target data into the memory block corresponding to the stream selected for assignment of the target data (operation S400), when the target data is assigned to a first stream selected from the plurality of streams (operation S411: YES), the target data may be written into a first memory block among the plurality of memory blocks (operation S413). The first memory block may correspond to the first stream. When the target data is not assigned to the first stream (operation S411: NO), the target data may be written into a memory block other than the first memory block among the plurality of memory blocks (operation S415). In other words, the target data may be written into the memory block already in use for the first stream.

Referring to FIGS. 1 and 15, when writing the target data into the memory block corresponding to the stream selected for assignment of the target data (operation S400), operations S411 and S415 in FIG. 15 may be substantially the same as operations S411 and S415 in FIG. 14, respectively.

When the target data is assigned to the first stream (operation S411: YES), and/or when a first memory block has been assigned to the first stream (operation S421: YES), the target data may be written into the first memory block (operation S413). When the target data is assigned to the first stream (operation S411: YES), and/or when a first memory block has not yet been assigned to the first stream (operation S421: NO), e.g., when the first stream is allocated first and/or when data to which the first stream is assigned is first written, the target data may be written into a free memory block among the plurality of memory blocks (operation S423). In other words, the memory block may be switched from a free state to an open state, and then may be used.

Referring to FIGS. 1 and 16, when writing the target data into the memory block corresponding to the stream selected for assignment of the target data (operation S400), operations S411 and S415 in FIG. 16 may be substantially the same as operations S411 and S415 in FIG. 14, respectively.

When the target data is assigned to the first stream (operation S411: YES), and/or when a storage space in the first memory block corresponding to the first stream is sufficient (operation S431: YES), the target data may be written into the first memory block (operation S413). When the target data is assigned to the first stream (operation S411: YES), and/or when the storage space in the first memory block is insufficient (operation S431: NO), the target data may be written into a free memory block among the plurality of memory blocks (operation S433). Operation S433 in FIG. 16 may be similar to operation S423 in FIG. 15.

Although FIGS. 14, 15 and 16 illustrate that a write operation for the target data is performed based on an example where the target data is assigned to the first stream, some example embodiments are not limited thereto. For example, a write operation may be performed in the same manner illustrated in FIGS. 14, 15 and 16 for each of all streams.

Figure 17:
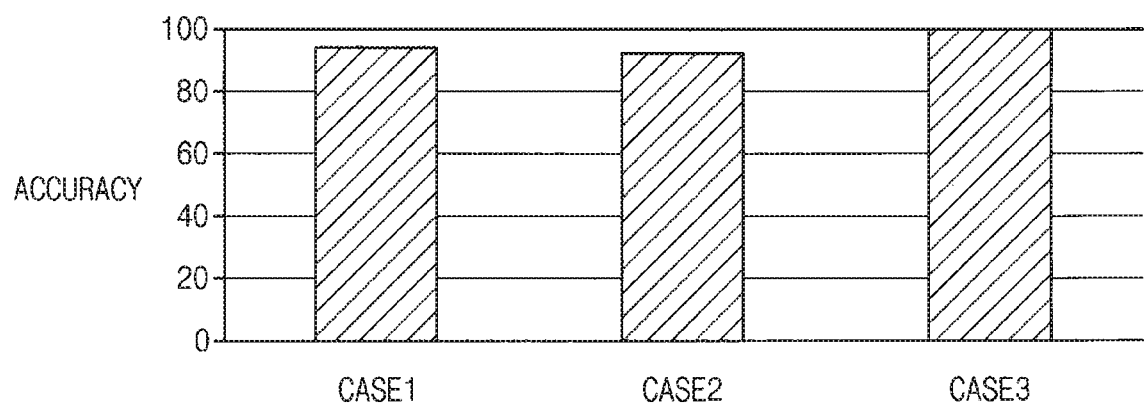
FIG. 17 is a diagram illustrating performance of a method of operating a storage device according to some example embodiments.

FIG. 17 is a diagram illustrating performance of a method of operating a storage device according to some example embodiments.

Referring to FIG. 17, one experiment is conducted using the ext4 file system to check an accuracy of data classification by a data classifier such as an neural network model NNM included in the storage device according to some example embodiments.

An MLP model including three hidden layers is used as the neural network model NNM. The number of learning and/or training parameters in the MLP model is about 557,827. An input of the model uses about 4K (e.g., about 4096) size from the beginning of file (e.g., a part of the file). An output of the model classifies the target data according to data type, such as having 0 for journal data, 1 for metadata and 2 for other user data and/or general data. As a result of the classification model learning, a training accuracy is about 97%, and a test accuracy is about 97%. In addition, when about 373 journal files, about 397 metafiles, and 414 general files are used as test sets, an inference accuracy CASE1 for the journal files, an inference accuracy CASE2 for the metafiles and an inference accuracy CASE3 for the general files using the learned model are about 94%, 93% and 100%, respectively, as illustrated in FIG. 17.

Figure 18:
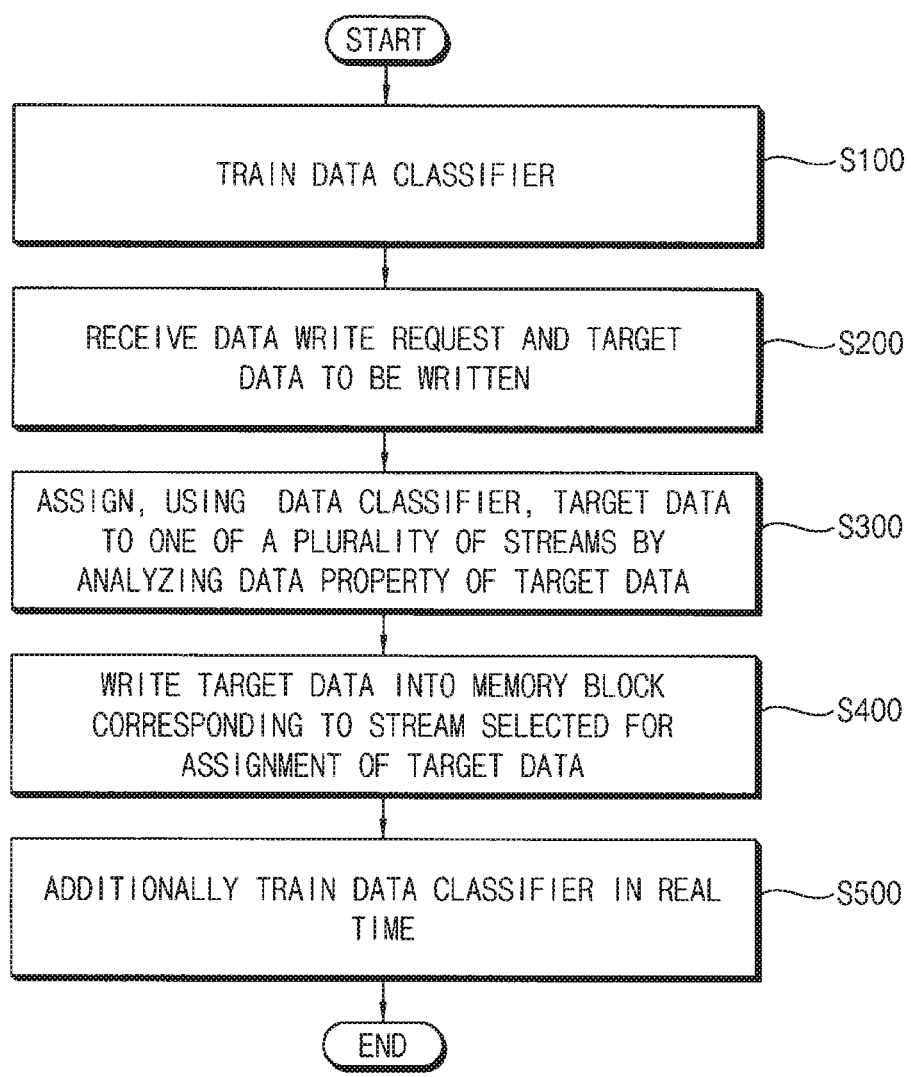
FIG. 18 is a flowchart illustrating a method of operating a storage device according to some example embodiments.

FIG. 18 is a flowchart illustrating a method of operating a storage device according to some example embodiments. The descriptions repeated with FIG. 1 will be omitted.

Referring to FIG. 18, in a method of operating the storage device according to some example embodiments, operations S100, S200, S300 and S400 in FIG. 18 may be substantially the same as operations S100, S200, S300 and S400 in FIG. 1, respectively.

In some example embodiments, a data classifier such as a neural network model may be additionally trained and/or learned in real time and/or during runtime (operation S500). As described with reference to FIGS. 19 and 20, the number of the plurality of streams may be changeable as the data classifier is additionally trained and/or learned in real time and/or during runtime. In this example, one of the updated streams may be selected for assignment of target data to be written that is received after the additionally training and/or learning operation.

Figure 19:
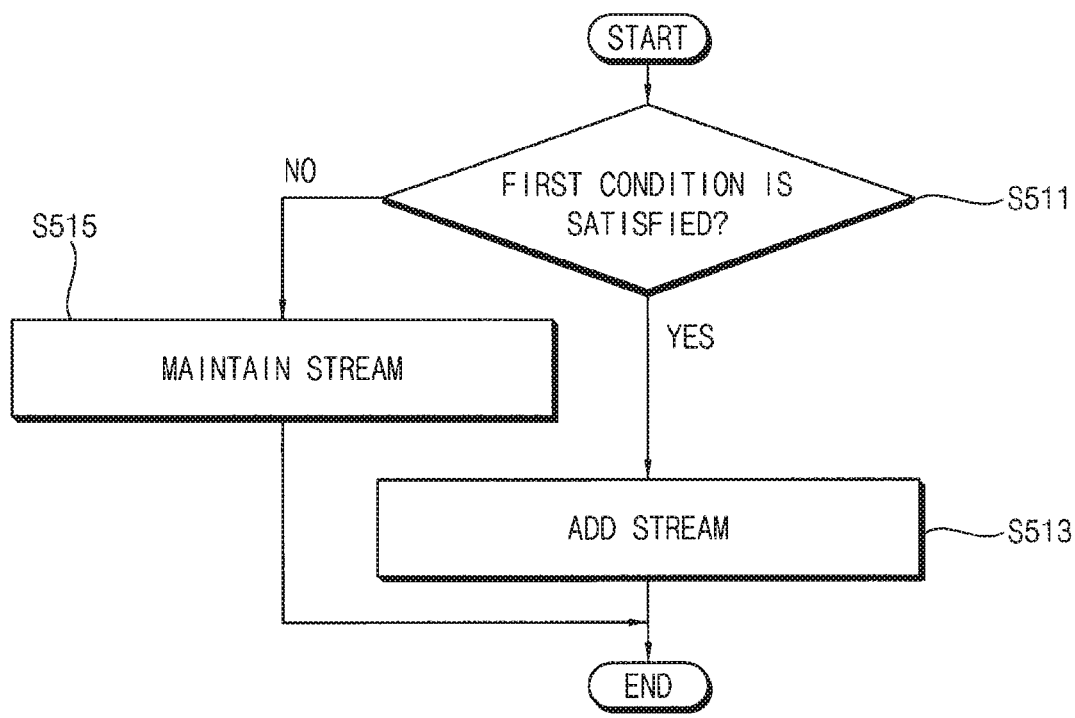
FIGS. 19 and 20 are flowcharts illustrating an example of additionally training a data classifier in real time in FIG. 18 according to some example embodiments.
Figure 20:
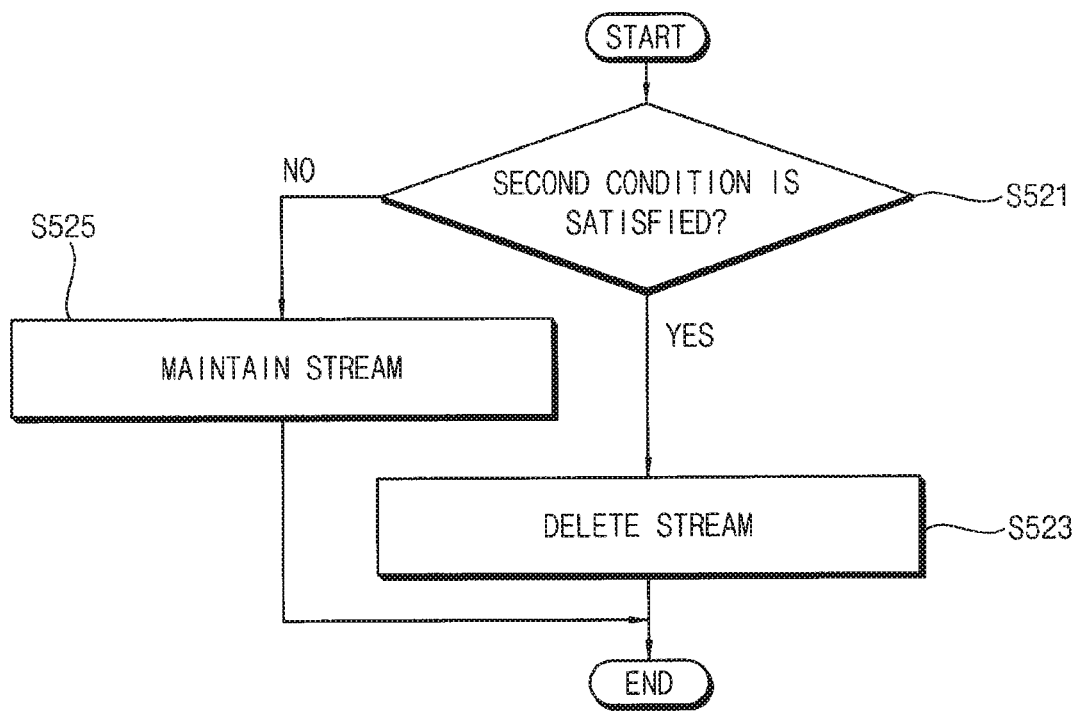

FIGS. 19 and 20 are flowcharts illustrating an example of additionally training a data classifier such as a neural network model in real time in FIG. 18.

Referring to FIGS. 18 and 19, when additionally training the data classifier in real time (operation S500), an operating environment of the storage device may be analyzed to check whether a first condition is satisfied or not (operation S511). The first condition may include a case where it is necessary to add a specific stream. For example, the first condition may include a case in which the amount of data to which one stream is assigned is too large (e.g., where a first stream has a size that exceeds a size threshold) and/or may be managed separately from two or more, a case in which it is necessary to additionally use specific format data that did not exist previously (e.g., where target data has a new data property for which the data classifier does not assign the target data to any of the plurality of streams), or the like.

When the operating environment of the storage device satisfies the first condition (operation S511: YES), a new stream may be added (operation S513), and thus the number of streams used in the storage device may increase. When the operating environment of the storage device does not satisfy the first condition (operation S511: NO), the streams that were previously used may be maintained (operation S515).

Referring to FIGS. 18 and 20, and in some example embodiments, when additionally training a data classifier such as an neural network model in real time (operation S500), the operating environment of the storage device may be analyzed to check whether a second condition is satisfied or not (operation S521). The second condition may include a case where it is necessary to delete a selected stream. For example, the second condition may include a case in which data having a selected stream is not used for a long period of time (e.g., where the selected stream has not been selected for assignment of target data within a threshold period), a case in which data having a specific stream is no longer used (e.g., where target data that has been assigned to a selected stream has not been accessed within a threshold period), or the like.

When the operating environment of the storage device satisfies the second condition (operation S521: YES), at least one of the streams that were previously used may be deleted (operation S523), and thus the number of streams used in the storage device may decrease. When the operating environment of the storage device does not satisfy the second condition (operation S521: NO), the streams that were previously used may be maintained (operation S525).

As will be appreciated by those skilled in the art, some example embodiments of some inventive concepts may be embodied as a system, method, computer program product, and/or a computer program product embodied in one or more computer readable medium(s) having computer readable program code embodied thereon. The computer readable program code may be provided to a processor 311 of a general purpose computer, special purpose computer, or other programmable data processing apparatus. The computer readable medium may be a computer readable signal medium or, alternatively, a computer readable storage medium. The computer readable storage medium may be any tangible medium that may contain and/or store a program for use by and/or in connection with an instruction execution system, apparatus, or device. For example, the computer readable medium may be a non-transitory computer readable medium.

Figure 21:
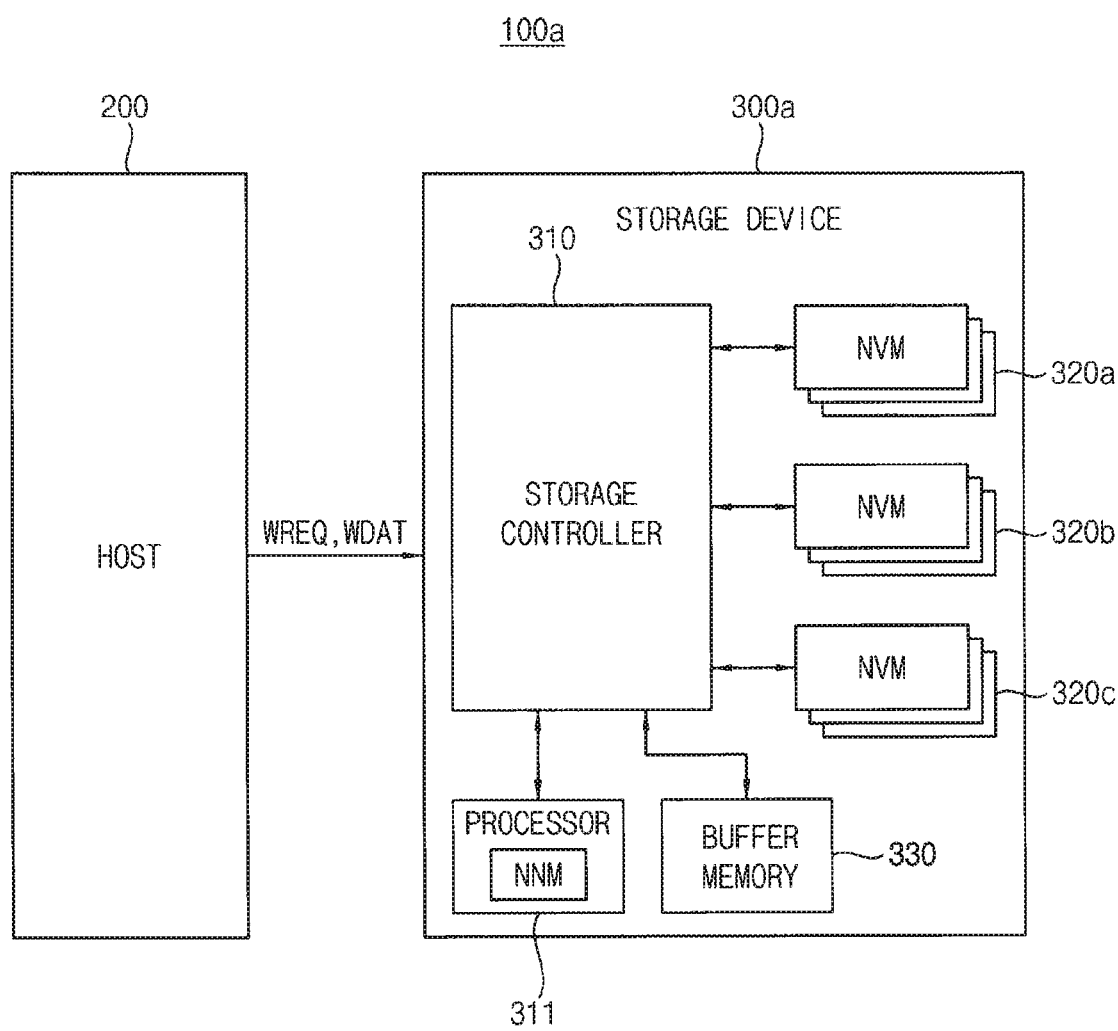
FIGS. 21 and 22 are block diagrams illustrating a storage device and a storage system including the storage device according to some example embodiments.
Figure 22:
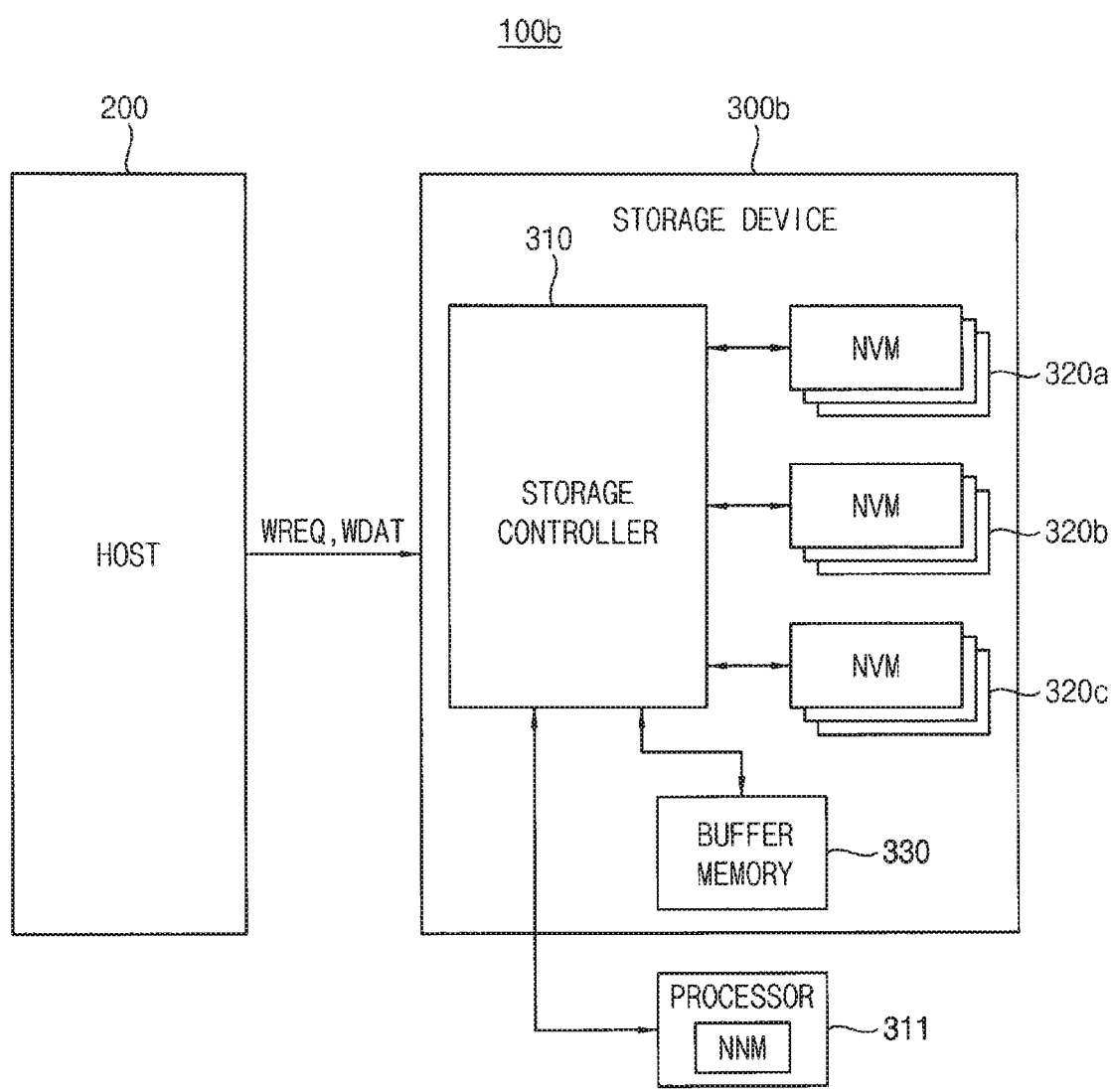

FIGS. 21 and 22 are block diagrams illustrating a storage device and a storage system including the storage device according to some example embodiments. The descriptions repeated with FIG. 2 will be omitted.

Referring to FIG. 21, a storage system 100a includes a host 200 and a storage device 300a.

The storage system 100a of FIG. 21 may be substantially the same as the storage system 100 of FIG. 2, except that the storage device 300a in FIG. 21 further includes a processor 311.

The processor 311 may be included in the storage device 300a, may be located outside the storage controller 310, and/or may be implemented separately from another processor 311 included in the storage controller 310. In an example of FIG. 21, a data classifier such as a neural network model NNM may be executed and/or driven by the processor 311.

Referring to FIG. 22, a storage system 100b includes a host 200, a storage device 300b and an external processor 311.

The storage system 100b of FIG. 22 may be substantially the same as the storage system 100 of FIG. 2, except that the storage system 100b of FIG. 22 further includes the processor 311.

In some example embodiments, the processor 311 may be located outside the storage device 300b, and/or may be implemented separately from another processor 311 included in the host 200 and/or a processor included in the storage controller 310 (such as shown in FIG. 3). In an example of FIG. 22, a data classifier such as a neural network model NNM may be executed and/or driven by the processor 311.

In some example embodiments, a storage device 300 and/or storage controller 310 may include a processor 311. In some example embodiments, including the example embodiments shown in FIGS. 21 and 22, the processor 311 may include at least one of a central processing unit (CPU), a graphic processing unit (GPU), a neural processing unit (NPU), a digital signal processor (DSP), an image signal processor (ISP) and/or dedicated hardware. In some example embodiments, the processor 311 may include logic circuits; a hardware/software combination, such as a processor executing software; and/or a combination thereof. For example, a processor 311 may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Figure 23:
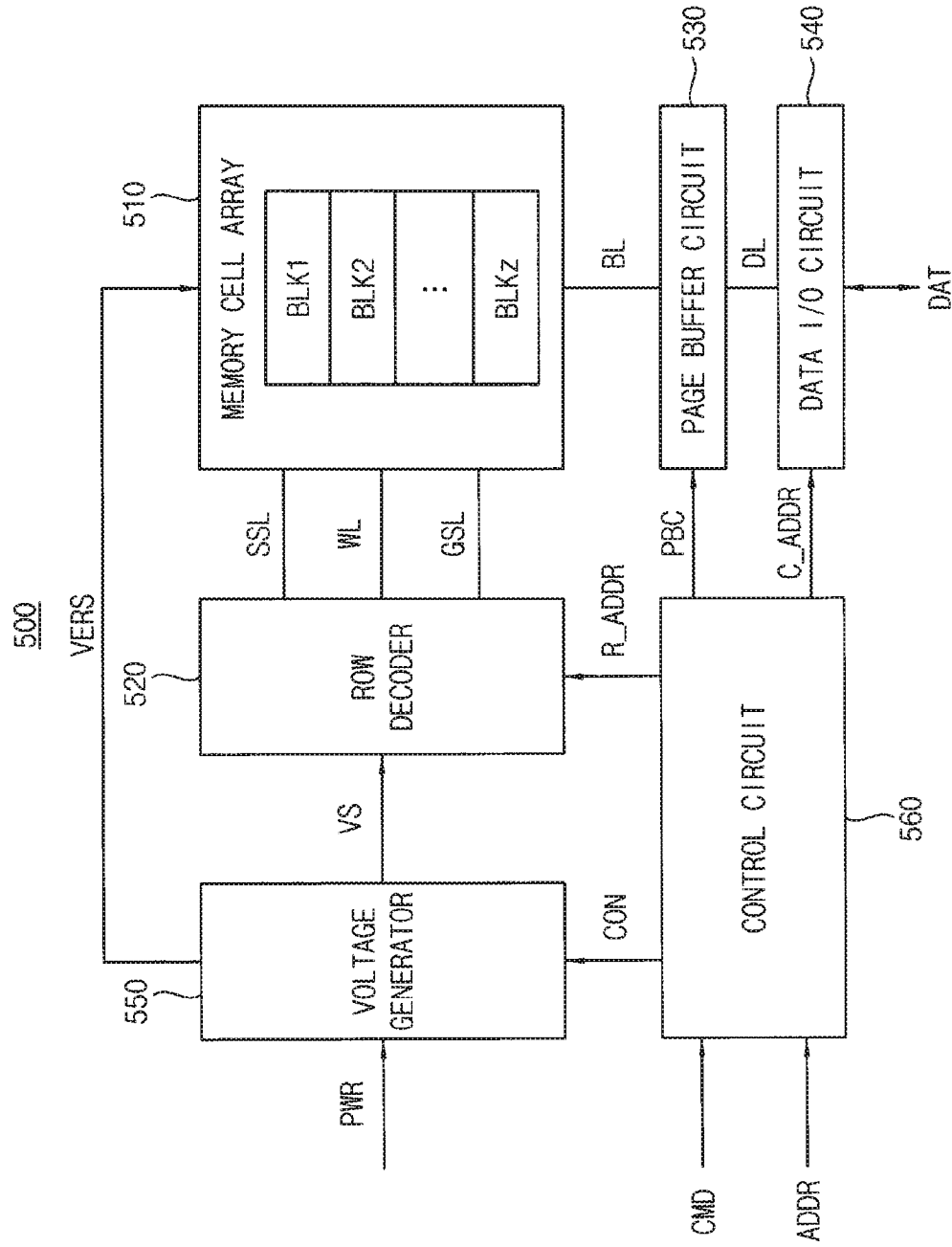
FIG. 23 is a block diagram illustrating an example of a nonvolatile memory device included in a storage device according to some example embodiments.

FIG. 23 is a block diagram illustrating an example of a nonvolatile memory device included in a storage device according to some example embodiments.

Referring to FIG. 23, a nonvolatile memory device 500 includes a memory cell array 510, a row decoder 520, a page buffer circuit 530, a data input/output (I/O) circuit 540, a voltage generator 550 and/or a control circuit 560.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, BLKz each of which includes memory cells. In some example embodiments, the plurality of memory cells may be arranged in a two dimensional (2D) array structure or a three dimensional (3D) vertical array structure.

A three-dimensional vertical array structure may include vertical cell strings that are vertically oriented such that at least one memory cell is located over another memory cell. The at least one memory cell may include a charge trap layer. Some example configurations for a memory cell array may include a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from a memory controller (e.g., the host 200 and/or the storage controller 310 in FIG. 2), and control erasure, programming and/or read operations of the nonvolatile memory device 500 based on the command CMD and the address ADDR. An erasure operation may include performing a sequence of erase loops, and/or a program operation may include performing a sequence of program loops. Each program loop may include a program operation and/or a program verification operation. Each erase loop may include an erase operation and/or an erase verification operation. The read operation may include a normal read operation and/or data recover read operation.

For example, the control circuit 560 may generate control signals CON, which are used for controlling the voltage generator 550, and/or may generate control signal PBC for controlling the page buffer circuit 530, based on the command CMD, and/or may generate a row address R_ADDR and a column address C_ADDR based on the address ADDR. The control circuit 560 may provide the row address R_ADDR to the row decoder 520 and/or may provide the column address C_ADDR to the data I/O circuit 540.

The row decoder 520 may be connected to the memory cell array 510 via the plurality of string selection lines SSL, the plurality of wordlines WL and/or the plurality of ground selection lines GSL.

The voltage generator 550 may generate voltages VS for operation of the nonvolatile memory device 500 based on a power PWR and/or the control signals CON. The voltages VS may be applied to the plurality of string selection lines SSL, the plurality of wordlines WL and/or the plurality of ground selection lines GSL via the row decoder 520. In addition, the voltage generator 550 may generate an erase voltage VERS for the data erase operation based on the power PWR and/or the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 and/or may read data DAT sensed from the memory cell array 510. In other words, the page buffer circuit 530 may operate as a write driver and/or a sensing amplifier according to an operation mode of the nonvolatile memory device 500.

The data I/O circuit 540 may be connected to the page buffer circuit 530 via data lines DL. The data I/O circuit 540 may provide the data DAT from outside of the nonvolatile memory device 500 to the memory cell array 510 via the page buffer circuit 530 and/or may provide the data DAT from the memory cell array 510 to the outside of the nonvolatile memory device 500, based on the column address C_ADDR.

Figure 24:
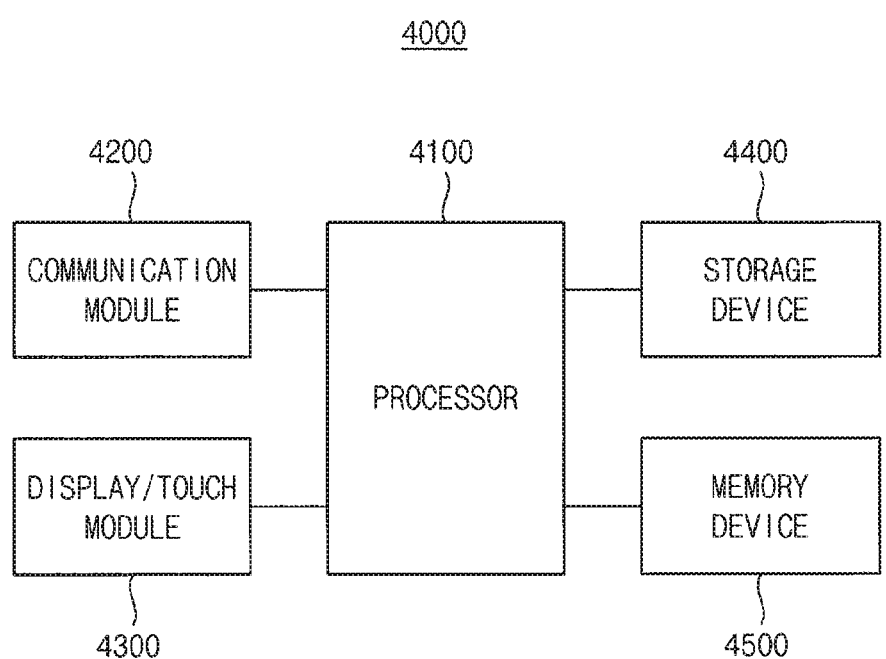
FIG. 24 is a block diagram illustrating an electronic system according to some example embodiments.

FIG. 24 is a block diagram illustrating an electronic system according to some example embodiments.

Referring to FIG. 24, an electronic system 4000 includes at least one processor 4100, a communication module 4200, a display/touch module 4300, a storage device 4400, and a memory device 4500. For example, the electronic system 4000 may be any mobile system or any computing system. The processor 4100 may correspond to and/or may be similar to the processor 311 of FIGS. 21 and/or 22.

The processor 4100 controls operations of the electronic system 4000. The processor 4100 may execute an operating system and/or at least one application to provide an internet browser, games, videos, or the like. The communication module 4200 is implemented to perform wireless and/or wire communications with an external device. The display/touch module 4300 is implemented to display data processed by the processor 4100 and/or to receive data through a touch panel. The storage device 4400 is implemented to store user data, and/or is driven based on the method of operating the storage device according to some example embodiments. The memory device 4500 temporarily stores data used for processing operations of the electronic system 4000. The processor 4100 and/or the storage device 4400 in FIG. 24 may correspond to the host 200 and/or the storage device 300 in FIG. 2, respectively.

Some example embodiments of some inventive concepts may be applied to various electronic devices and/or electronic systems including the storage device and the storage system. For example, some example embodiments of some inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, and/or a robotic device.

The foregoing is illustrative of some example embodiments and is not to be construed as limiting thereof. Although some example embodiments have been described, those skilled in the art will readily appreciate that many modifications are possible in some example embodiments without materially departing from the subject matter of the present disclosure. Accordingly, all such modifications are intended to be included within the scope of at least some example embodiments as defined in the claims. Therefore, it is to be understood that the foregoing is illustrative of some example embodiments and is not to be construed as limited to the specific example embodiments disclosed, and that modifications to the disclosed example embodiments, as well as other example embodiments, are intended to be included within the scope of the appended claims.

As used herein, terms such as "when" and "while" may, but are not necessarily intended to, imply a chronological relationship such as a sequence of events. For example, operations that are described as occurring "when" or "while" a condition is fulfilled may be performed concurrently with the fulfillment of the condition, or during the fulfillment of the condition, or after the fulfillment of the condition, or because the condition is fulfilled or has been fulfilled, etc. Similarly, phrases such as "on condition of" that associate an operation with a condition may indicate that the operation is performed concurrently with the fulfillment of the condition, or during the fulfillment of the condition, or after the fulfillment of the condition, or because the condition is fulfilled or has been fulfilled, etc. All such interpretations that are reasonably and logically possible, and that are not contradictory with other statements, are intended to be included in this disclosure, the scope of which is to be understood as being limited only by the claims.

Each of the flowcharts presented and discussed herein depicts a set of operations that are arranged in a certain order. However, it is to be appreciated that the arrangement of the operations in each flowchart depicts only one example, and that operations may be added, removed, reordered, and/or performed concurrently in accordance with the subject matter of the present disclosure. As but one example, in some embodiments and as shown in FIG. 1, operation S100 of training a data classifier may occur before operation S200 of receiving a data write request and target data to be written; however, in other embodiments, operation S100 may occur simultaneously with and/or after operation S200. All such variations that are reasonably and logically possible, and that are not contradictory with other statements, are intended to be included in this disclosure, the scope of which is to be understood as being limited only by the claims.

What is claimed is:

1. A method of operating a storage device including a plurality of memory blocks of a memory device, the method comprising:

receiving a data write request and target data to be written;

assigning the target data to a stream selected from a plurality of streams using a data classifier that is configured to select the stream from the plurality of streams based on a data property of the target data, the data classifier including a set of learnable filters; and writing the target data into a memory block selected from the plurality of memory blocks forming write data, wherein the memory block has been assigned to the stream to which the target data has been assigned;

training the data classifier during the operation of the storage device; and changing a number of the plurality of streams to the plurality of memory blocks based on the training of the data classifier, wherein each of the learnable filters slides across a width or height of an input volume during a forward pass of the target data.

2. The method of claim 1, wherein the data property is a change period of the target data, and respective streams of the plurality of streams represent the change period of the target data assigned to the stream.

3. The method of claim 2, wherein assigning the target data to one of the plurality of streams includes, assigning the target data to a first stream selected among the plurality of streams on condition of determining that the change period of the target data is shorter than a first reference time, and assigning the target data to a second stream among the plurality of streams on condition of determining that the change period of the target data is longer than or equal to the first reference time.

4. The method of claim 1, wherein respective streams of the plurality of streams represent a regularity of the target data.

5. The method of claim 4, wherein assigning the target data to one of the plurality of streams includes, assigning the target data to a first stream selected from the plurality of streams on condition of determining that a plurality of data bits of the target data have the regularity, and assigning the target data to a second stream selected from the plurality of streams on condition of determining that the plurality of data bits of the target data does not have the regularity.

6. The method of claim 1, wherein assigning the target data to one of the plurality of streams includes, assigning the target data to a first stream selected from the plurality of streams on condition of determining that a plurality of data bits of the target data has a pattern, and assigning the target data to a second stream selected from the plurality of streams on condition of determining that the plurality of data bits of the target data does not have the pattern.

7. The method of claim 1, wherein assigning the target data to one of the plurality of streams includes, assigning the target data to a first stream selected from the plurality of streams on condition of determining that a plurality of data bits of the target data has a first pattern, and assigning the target data to a second stream selected from the plurality of streams on condition of determining that the plurality of data bits of the target data has a second pattern.

8. The method of claim 1, wherein writing the target data into the memory block includes writing the target data into a first memory block selected among the plurality of memory blocks for assignment to a first stream selected from the plurality of streams on condition of assigning the target data to the first stream.

9. The method of claim 1, wherein writing the target data into the memory block includes assigning a free memory block selected among the plurality of memory blocks to a first stream on condition of determining that a first memory block has not yet been assigned to the first stream.

10. The method of claim 1, wherein writing the target data into the memory block includes assigning a free memory block selected among the plurality of memory blocks to a first stream on condition of determining that a storage space in a first memory block that has been assigned to the first stream is insufficient to store the target data.

11. The method of claim 1, further comprising:
training the data classifier before assigning the target data to the stream selected from the plurality of streams.

12. The method of claim 1, wherein
the training of the data classifier is performed in real time.

13. The method of claim 12, wherein
the changing the number of the plurality of streams is based on the real time training of the data classifier.

14. A storage device comprising:
a plurality of memory blocks; and
a storage controller configured to
receive a data write request and target data to be written,
assign the target data to a stream selected from a plurality of streams using a data classifier that is configured to select the stream from the plurality of streams based on a data property of the target data, the data classifier including a set of learnable filters,
write the target data into a memory block selected from the plurality of memory blocks forming write data, wherein the memory block has been assigned to the stream to which the target data has been assigned,
train during an operation of the storage device, and
change a number of the plurality of streams to the plurality of memory blocks based on the training,
wherein each of the learnable filters slides across a width or height of an input volume during a forward pass of the target data.

15. The storage device of claim 14, wherein
the storage controller includes at least one processor, and the data classifier is driven by the at least one processor.

16. The storage device of claim 14, further comprising:
at least one processor located outside the storage controller, and
the data classifier is driven by the at least one processor.

17. The storage device of claim 14, wherein the data classifier is driven by at least one processor located outside the storage device.

18. The storage device of claim 14, further comprising:
a buffer memory configured to temporarily store the target data before the target data is written into the memory block.

19. A storage system comprising:
a host configured to provide a data write request and target data; and
a storage device including a plurality of memory blocks and a storage controller configured to write the target data into the plurality of memory blocks based on the data write request,
wherein the storage controller includes a data classifier that is configured to select a stream from a plurality of streams based on a data property of the target data, the data classifier including a set of learnable filters,
wherein the storage controller is configured to
receive the data write request and the target data,
assign the target data to the stream selected from the plurality of streams using the data classifier,
write the target data into a memory block that is assigned to the stream forming write data, train during an operation of the storage device, and change a number of the plurality of streams to the plurality of memory blocks based on the training,
wherein each of the learnable filters slides across a width or height of an input volume during a forward pass of the target data.

20. The storage system of claim 19, wherein assigning the target data to the stream selected from the plurality of streams and writing the target data into the memory block are performed independently of a control of the host.

* * * * *